US009027838B2

(12) United States Patent
Nunnink et al.

(10) Patent No.: US 9,027,838 B2
(45) Date of Patent: May 12, 2015

(54) SYSTEM AND METHOD FOR EXPANSION OF FIELD OF VIEW IN A VISION SYSTEM

(71) Applicant: Cognex Corporation, Natick, MA (US)

(72) Inventors: Laurens Nunnink, Simpleveld (NL); Carl W. Gerst, III, Clifton Park, NY (US); William Equitz, Brookline, MA (US); Matthew D. Engle, Watertown, MA (US)

(73) Assignee: Cognex Corporation, Natick, MA (US)

( * ) Notice: Subject to any disclaimer, the term of this patent is extended or adjusted under 35 U.S.C. 154(b) by 80 days.

(21) Appl. No.: 13/645,241

(22) Filed: Oct. 4, 2012

(65) Prior Publication Data

US 2013/0201563 A1    Aug. 8, 2013

Related U.S. Application Data

(63) Continuation-in-part of application No. 13/367,141, filed on Feb. 6, 2012, now Pat. No. 8,646,690.

(51) Int. Cl.
| | |
|---|---|
| G02B 26/08 | (2006.01) |
| G02B 27/14 | (2006.01) |
| G02B 27/10 | (2006.01) |

(52) U.S. Cl.
CPC ............ *G02B 27/14* (2013.01); *G02B 27/1066* (2013.01); *G02B 27/143* (2013.01)

(58) Field of Classification Search
USPC .................. 235/462.22, 462.24, 462.35, 454; 386/223, 224
See application file for complete search history.

(56) References Cited

U.S. PATENT DOCUMENTS

| | | | |
|---|---|---|---|
| 4,288,819 | A | 9/1981 | Williams |
| 5,049,740 | A | 9/1991 | Pines et al. |
| 5,161,051 | A | 11/1992 | Whitney et al. |
| 5,532,737 | A | 7/1996 | Braun |
| 5,555,090 | A | 9/1996 | Schmutz |
| 5,627,360 | A | 5/1997 | Rudeen |
| 5,760,884 | A | 6/1998 | Yahashi et al. |
| 5,790,181 | A | 8/1998 | Chahl et al. |
| 5,831,762 | A | 11/1998 | Baker et al. |
| 5,856,888 | A | 1/1999 | Ross et al. |
| 5,992,744 | A | 11/1999 | Smith et al. |
| 6,088,133 | A | 7/2000 | Francis et al. |
| 6,135,352 | A * | 10/2000 | Girotti ......................... 235/454 |
| 6,433,859 | B1 | 8/2002 | Nakata |

(Continued)

FOREIGN PATENT DOCUMENTS

| | | |
|---|---|---|
| EP | 1492357 A2 | 12/2004 |
| WO | 8603916 | 7/1986 |
| WO | 2010053682 A1 | 5/2010 |

*Primary Examiner* — Ahshik Kim
(74) *Attorney, Agent, or Firm* — Loginov & Associates, PLLC

(57) ABSTRACT

This invention provides a field of view expander (FOVE) removably attached to a vision system camera having an image sensor defining an image plane. In an embodiment the FOVE includes first and second mirrors that transmit light from a scene in respective first and second partial fields of view along first and second optical axes. Third and fourth mirrors respectively receive reflected light from the first and second mirrors. The third and fourth mirrors reflect the received light onto the image plane in a first strip and a second strip adjacent to the first strip. The first and second optical axes are approximately parallel and a first focused optical path length between the scene and the image plane and a second focused optical path between the image plane and the scene are approximately equal in length. The optical path can be rotated at a right angle in embodiments.

26 Claims, 26 Drawing Sheets

(56) References Cited

U.S. PATENT DOCUMENTS

| | | |
|---|---|---|
| 6,501,537 B1 | 12/2002 | Chahl et al. |
| 6,572,017 B1 | 6/2003 | Stoner |
| 6,588,669 B1 * | 7/2003 | Claus et al. ............... 235/462.4 |
| 6,609,660 B1 | 8/2003 | Stoner |
| 7,303,131 B2 | 12/2007 | Carlson et al. |
| 7,306,151 B2 * | 12/2007 | Ito et al. ...................... 235/454 |
| 7,543,749 B2 | 6/2009 | Knowles et al. |
| 7,576,925 B2 | 8/2009 | Benayahu et al. |
| 7,626,150 B2 | 12/2009 | Chen et al. |
| 7,792,386 B1 | 9/2010 | Worthington et al. |
| 7,860,273 B2 | 12/2010 | Kochi et al. |
| 7,886,978 B2 | 2/2011 | Ofek et al. |
| 7,999,841 B1 | 8/2011 | Stevens |
| 8,086,072 B2 | 12/2011 | Edwards et al. |
| 8,108,622 B2 | 1/2012 | Nonogaki et al. |
| 8,646,690 B2 | 2/2014 | Nunnink et al. |
| 2004/0262394 A1 | 12/2004 | Longacre, Jr. et al. |
| 2008/0260297 A1 | 10/2008 | Chung et al. |
| 2010/0060651 A1 | 3/2010 | Gala |
| 2011/0080414 A1 | 4/2011 | Wang |
| 2011/0164108 A1 | 7/2011 | Bates et al. |
| 2011/0174881 A1 | 7/2011 | Samek et al. |
| 2012/0000981 A1 | 1/2012 | Meier et al. |

* cited by examiner

SYSTEM AND METHOD FOR EXPANSION OF FIELD OF VIEW IN A VISION SYSTEM

RELATED APPLICATION

This application is a continuation-in-part of co-pending U.S. patent application Ser. No. 13/367,141, filed Feb. 6, 2012, entitled SYSTEM AND METHOD FOR EXPANSION OF FIELD OF VIEW IN A VISION SYSTEM, by Laurens Nunnink, et al., the entire disclosure of which is herein incorporated by reference.

FIELD OF THE INVENTION

This invention relates to vision systems, and more particularly to systems and methods for expanding the field of view of a vision system camera lens.

BACKGROUND OF THE INVENTION

Vision systems that perform measurement, inspection, alignment of objects and/or decoding of symbology (e.g. bar codes—also termed "IDs") are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes. The image is processed to identify barcode features, which are then decoded by a decoding process and/or processor obtain the inherent alphanumeric data represented by the code.

A common use for ID readers is to track and sort objects moving along a line (e.g. a conveyor) in manufacturing and logistics operations. The ID reader can be positioned over the line at an appropriate viewing angle to acquire any expected IDs on respective objects as they each move through the field of view. The focal distance of the reader with respect to the object can vary, depending on the placement of the reader with respect to the line and the size of the object. That is, a larger object may cause IDs thereon to be located closer to the reader, while a smaller/flatter object may contain IDs that are further from the reader. In each case, the ID should appear with sufficient resolution to be properly imaged and decoded. Thus, the field of view of a single reader, particularly in with widthwise direction (perpendicular to line motion) is often limited. Where an object and/or the line is relatively wide, the lens and sensor of a single ID reader may not have sufficient field of view in the widthwise direction to cover the entire width of the line while maintaining needed resolution for accurate imaging and decoding of IDs. Failure to image the full width can cause the reader to miss IDs that are outside of the field of view.

There are several techniques that can be employed to overcome the limitation in field of view of a single ID reader, and expand the systems overall field of view in the widthwise direction. For example, one can employ multiple ID readers/cameras focused side by side to fully cover the width of the line. This is often an expensive solution as it requires additional hardware and optics. Alternatively, a line-scan system with inherently wider FOV can be employed. However, this arrangement can also increase costs as it requires more specialized hardware and generally increases complexity. For example, an encoder is often needed to sense relative movement of the line when using a line-scan arrangement. Another technique is to employ a larger sensor, in the single ID reader to provide the desired resolution for appropriately imaging the scene along the widthwise direction. However, the approach again entails additional cost through the use of less-conventional hardware. Moreover, most sensors (e.g. CMOS sensors, but other types, such as CCD, are also contemplated) are commercially available in a standard format, such as 4×3 or 16×9, and thus, providing a larger widthwise resolution also entails a similarly enlarged height (i.e. the direction of line motion) resolution. The increased height direction may cause the sensor to capture the same ID in a plurality of captured image frames as the object passes through the enlarged field of view. This, in turn leads to extraneous processing and/or decoding of the same ID and the risk that a single object is mistaken for a plurality of objects passing under the reader.

It is therefore desirable to provide a system and method for expanding the field of view of an ID reader in the widthwise direction with respect to a moving line in a manner that does not decrease needed resolution. It is further desirable that the system and method allow use of a conventional sensor and camera optics. The system and method should be straightforward to install and use and should desirably avoid increasing resolution in the height/line-motion direction.

SUMMARY OF THE INVENTION

This invention overcomes disadvantages of the prior art by providing a system and method for expanding the field of view of a scene imaged by a vision system camera assembly having an image sensor defining an image plane. The system can be employed as an ID reader such that the field of view is generally free of loss of normal resolution of a camera assembly sensor, and ensures that features of interest, such as IDs, are fully imaged across the entire expanded field. In an embodiment a field of view expander (FOVE) comprises a removable accessory, provided to a camera assembly, with mirrors directed to receive light from different widthwise portions of a scene, which can be a moving line of objects. In various illustrative embodiments, the system is constructed and arranged to search and analyze features of interest (e.g. symbols or IDs) in the scene, and includes at least a first mirror and a second mirror that transmit light from an overall field of view in a scene in at least a first partial field of view along a first optical axis and a second partial field of view along a second optical axis. At least a third mirror receives reflected light from the first mirror and a fourth mirror receives reflected light from the second mirror. The third mirror and the fourth mirror are constructed and arranged to reflect the received light through the imager lens (lens assembly), and onto the image plane in a first strip and a second strip adjacent to the first strip. Illustratively, the first optical axis and the second optical axis are approximately parallel and a first focused optical path length between the scene and the image plane and a second focused optical path between the image and the scene are approximately equal in length. In this manner, the arrangement according to various embodiments facilitates optimal imaging of relatively wide, flat objects, such as boxes and cartons in relative motion with respect to the vision system. In addition, this arrangement facilitates the side-by-side placement of multiple vision system cameras with attached FOVEs. In placing such cameras they can be arranged so that the overlap regions (or non-overlapping borders of the partial fields of view in adjacent cameras are the same as the internal overlap and/or borders within the camera's internally generated partial fields of view. This allows data to be processed between adjacent fields of view free of any differences between the processing overlapping images within one camera or in two adjacent cameras. To facilitate processing, such cameras can be operatively interconnected in a synchronized arrangement—such as a master-slave arrangement—so that vision system processes and data are shared between the cameras. In alternate embodiments, a moving mirror changes position between acquired image frames so that a full width of the scene is imaged in successive frames.

In an illustrative embodiment, the image sensor can define a roughly square shape, and can (for example) define a wherein the M×N pixel resolution of 748×480 pixels, 1024×768 pixels, 2048×1088 pixels and 1280×1024 pixels, among other dimensions. The first strip and the second strip at the image plane can be arranged in a vertically stacked relationship on, each having a common horizontal overlap region. The overlap region can be defined at least as large horizontally as a largest feature of interest to be searched by the vision system camera. The searched feature of interest can be a symbology code and the vision system can further comprise a symbology code decoding system that receives information related to located symbology codes from the vision system camera and outputs code data to a further interconnected process. The symbology code can be located on an object moving on a conveyor through the scene.

In an illustrative embodiment of the FOVE, the first mirror comprises a first outboard mirror oriented over the first partial field of view and the second mirror comprises a second outboard mirror oriented over the second partial field of view. Each of the first outboard mirror and the second outboard mirror are oriented at an acute angle with respect to a horizontal plane. The third mirror comprises a first inboard mirror and the fourth mirror comprises a second inboard mirror. Each of the first inboard mirror and the second inboard mirror are respectively located on a first vertical plane and a second vertical plane, each substantially perpendicular to the horizontal plane. Illustratively, the first inboard mirror and the second inboard mirror are constructed and arranged to direct light from a scene from a vertical optical path through a right angle onto a horizontal optical path toward the image sensor. In this embodiment, the camera sensor is rotated so that a width dimension is oriented vertically. The first outboard mirror and the second outboard mirror can each be oriented at opposing 45-degree angles with respect to the horizontal plane. The first inboard mirror and the inboard mirror can each be oriented at opposing 45-degree angles with respect to each of the first vertical plane and the second vertical plane, respectively, that each (a) is perpendicular to the horizontal plane and (d) resides on an optical axis of the vision system camera. The first outboard mirror, the second outboard mirror, the first inboard mirror and the second inboard mirror can be mounted in a mirror enclosure having a unitary tubular structure and at least one removable end cover. The mirror enclosure can include keyway slots or other groove-like or rail-like structures for engaging mounting structures and accessories. Such accessories can include illuminators, such as removably attached bar illuminators.

In various embodiments, first mirror, the second mirror, the third mirror and the fourth mirror are enclosed in a housing, and the housing is operatively connected to a coupling removably attached to the camera. The coupling can include a sealed, slidable lens shroud that selectively allows access to a lens of the vision system camera. The coupling can be attached to an extension tube that extends the optical path of the FOVE. The system includes a vision processor and a liquid lens assembly. An auto-focus process is operated by the vision processor to focus the liquid lens. The vision processor can be adapted to determine the distance to an object based upon at least one of (a) size of an overlap region between the first partial field of view and the second partial field of view, and (b) relative position of an identified feature in an overlap region or the first partial field of view and the identified feature in an overlap region of the second partial field of view. In various embodiments the first mirror, the second mirror, the third mirror and the fourth mirror are all located in a mirror housing having a housing optical path therethrough. The vision processor is adapted to determine focus of the lens based upon an image of fiducial located along the housing optical path. The fiducial(s) can be located on at least one of the first mirror, the second mirror, the third mirror, the fourth mirror, and a transparent window on the mirror housing.

In various embodiments, the first partial field of view and the second partial field of view are approximately free of overlap therebetween. The vision processor is constructed and arranged to identify a partial code in each of the first partial field of view and the second partial field of view. Upon finding these partial codes, the vision processor is constructed and arranged to stitch together each partial code and generate decoded information therefrom. Both partial codes can be provided in a single captured image frame or, alternatively, the first partial code is provided in a first captured image frame at a first time. This first image frame is stored for subsequent handling, and the second partial code is provided in a second captured image frame at a second time subsequent to the first time. When both available, the two partial image frames are stitched together to generate the results.

In further embodiments, the first mirror comprises a first outer mirror oriented at an acute angle with respect to an optical axis of the camera and the second mirror comprises a second outer mirror oriented at an opposing acute angle with respect to an opposing side of the optical axis, and wherein the third mirror and the fourth mirror comprise a beam splitter located forward of the first outer mirror and the second outer mirror in a direction taken from the vision system camera. These mirrors can be enclosed in a housing that comprises an injection-molded structure polymer structure—for example a glass-filled polycarbonate shell. The first outer mirror and the second outer mirror can be mounted on a mirror-engaging side of respective unitary walls of the housing, the walls having unitary stiffing ribs on a side thereof opposite a mirror-engaging side. The housing can be attached to a coupling that removably engages the camera assembly. The arrangement can also include an accessory bracket operatively connected to the coupling and an illuminator adjacent to the housing and illuminating the scene, mounted on the bracket. The illuminator can comprise a bar illuminator or another illuminator type (or multiple types).

An illustrative search application that receives image data from the sensor locates and analyzes the overall image for features of interest that can occur in either strip or both strips if the feature is within a predetermined overlap region. This overlap region is illustratively wide enough to fully include in at least one strip, the widest feature to be imaged. In an illustrative embodiment, the features of interest can be barcodes (for example, one-dimensional type barcodes). These exemplary barcodes can be oriented to extend (i.e. in the case of a one-dimensional code—the "one" dimension extends) in the direction of field expansion (e.g. the "horizontal" or "widthwise" direction). In an embodiment, the first outer mirror and the second outer mirror are positioned at offset vertical positions. This vertical offset in the outer mirrors corresponds with the vertical positioning of the first reflecting surface and the second reflecting surface, which illustratively define crossing mirrors stacked vertically and defining an approximate crossing line passing approximately through the optical axis. To direct/project the respective field of view from each reflecting surface to a strip (or other geometrical arrangement on the sensor, each reflecting surface also includes an opposing slight vertical tilt inwardly and downwardly toward the optical axis. The object imaged can be one or more side-by-side objects in relative motion with respect to the expanded field of view (e.g. objects on a moving conveyor line).

In another embodiment, a system and method for expanding a field of view of a scene imaged by a camera of a vision system, which includes a vision system processor. The processor (and/or other hardware and/or software) causes the camera's sensor to acquire a plurality of image frames at a predetermined frame rate. A moving mirror projects light from the scene to the camera along the camera's optical axis. The mirror is driven by a drive that operates relative to the frame rate so as to vary an angular orientation of the reflective surface of the mirror with respect to the optical axis. In this manner, image frames are acquired using the moving mirror as it is positioned at each of a plurality of varying angular orientations with respect to the optical axis. As such, the acquired image frames collectively image an area in a horizontal direction that is greater than an area in the horizontal direction imaged in a single one of the image frames. An illustrative search application locates the features of interest in the image frames and outputs data based on the features of interest. These features of interest can be symbology codes, such as one-dimensional barcodes. The moving mirror can be a rotating polygonal mirror, or an oscillating mirror, having an axis of rotation taken perpendicular a horizontal plane that passes through the optical axis of the camera, and generally extends in the (horizontal) direction of field expansion. The illustrative polygonal mirror presents a plurality of sides, each at a slightly different orientation angle with respect to the axis. The light reflected from the scene by each angled side is bounded overall by a defined maximum width of field. These bounds can be provided by outwardly angled side walls positioned on either side of the optical axis (i.e. defining an outwardly tapered frustum shape) between the mirror and scene. An image is acquired at each orientation of the moving mirror surface. These acquired images collectively allow the search application to locate any features in any of the image frames over the extended width of field. Illustratively, the mirror's movement can be synchronized with the frame rate so that the pattern of orientations sides is constant. Alternatively, the mirror's movement can be asynchronous with respect to the frame rate so that a somewhat random pattern of angular orientations collectively images the entire field of view.

In a further illustrative embodiment, a vision system with an FOVE can include a mirror enclosure having a pair of outboard mirrors, each of which images a portion of an overall width of a scene, with an overlap therebetween at predetermined distances. The outboard mirrors are angled with respect to a horizontal plane. The reflected light from each of the outboard mirrors is reflected on a pair of respective mirrors of a V-shaped mirror assembly positioned along an optical axis of a camera assembly and including a pair of inboard mirrors each residing within one of a pair of intersecting vertical planes perpendicular to the horizontal plane, such that light reflected from the each of the outboard mirrors is rotated at an approximate right angle toward the camera assembly by each of the inboard mirrors. The projected light is received at the imager of the camera assembly in a pair of horizontally stacked strips. The camera assembly is illustratively rotated about the optical axis thereof so that the strips are oriented vertically on the imager based upon its standard orientation. Illustratively, the mirror enclosure is an extruded metal shell with external slots or grooves that receive attachment members for components items such as mounting assemblies and illuminators. The mirror enclosure is interconnected with the camera assembly via an extension tube that engages the enclosure and a coupling between the extension tube and the front face of the camera assembly. Illustratively, the coupling of this and other embodiments described above includes a set of supporting posts (or other, at least partial, open-framework structures) that allow access to a sealed, slidable lens shroud. The shroud is engaged by a slider with bushings that slide along the posts to reveal the underlying lens for adjustment and service. When slid open, the shroud passes into the interior of the extension tube. In other embodiments, the shroud can pass into the interior of the FOVE housing.

BRIEF DESCRIPTION OF THE DRAWINGS

The invention description below refers to the accompanying drawings, of which.

DETAILED DESCRIPTION

I. FOVE General Overview and Operation

Figure 1:
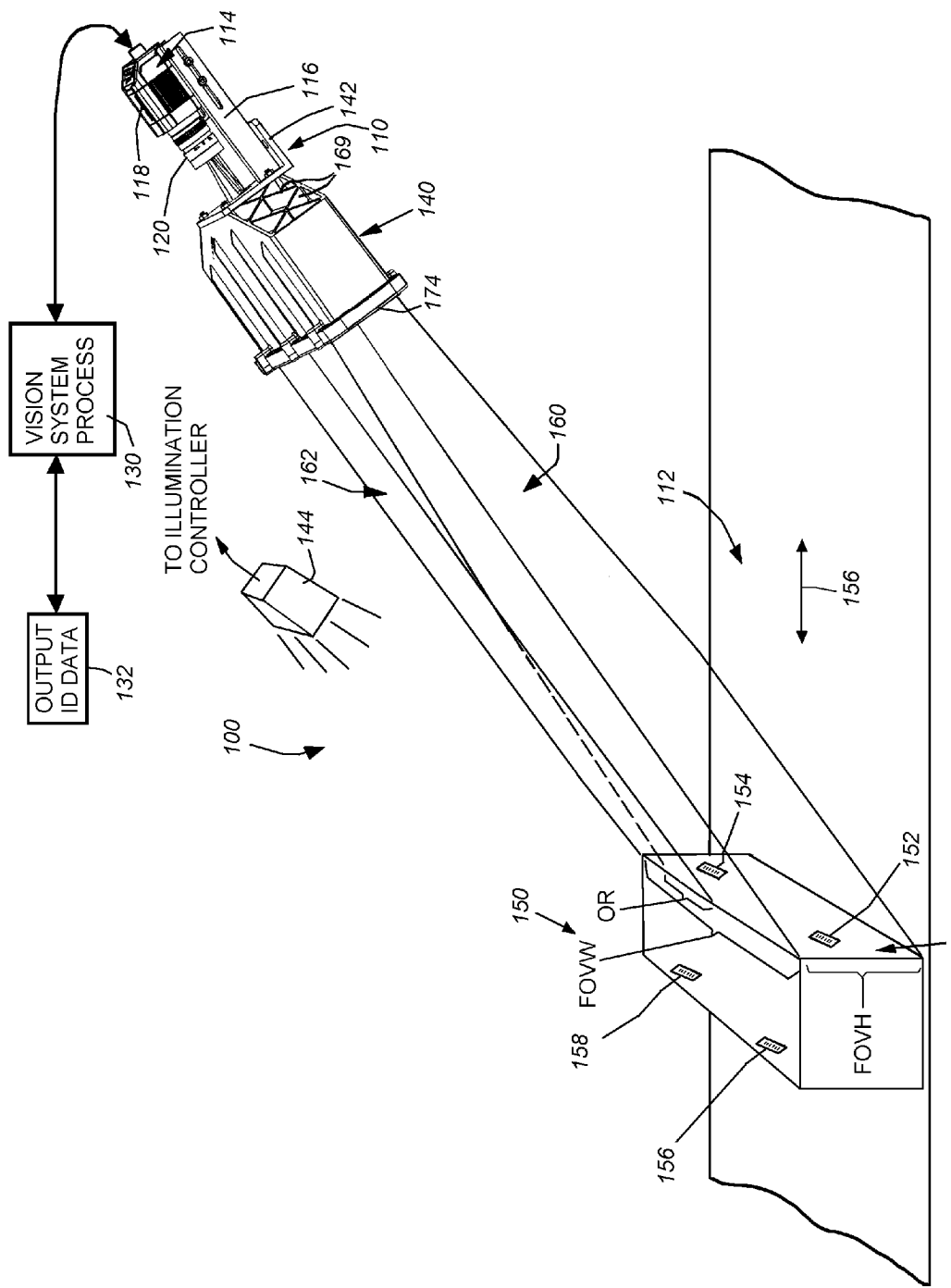
FIG. 1 is a perspective view of a vision system including a field of view expander (FOVE) according to an illustrative embodiment acquiring an image of an exemplary object on a moving line.

FIG. 1 shows a vision system arrangement 100 in which a vision system or ID reader assembly 110 oriented at an acute angle with respect to a moving line represented by a conveyor 112. The vision system 110 includes a camera assembly 114 adjustably mounted in a frame 116. The camera assembly includes the camera base 118 and a lens 120. A variety of camera implementations can be employed in alternate embodiments. In an embodiment, the base 118 includes an internal sensor (described below), having a pixel array for acquiring grayscale of color image data. The size of the array is highly variable. For example, the array can be a conventional rectangular (roughly square) array having a size of 1024×768 pixels. In alternate embodiments, other array sizes, including, but not limited to, 2048×384 or 2048×768 pixels can be employed. The camera base 118 can include an internal vision processor and ID (barcode) decoding circuit. Alternatively, the camera can transmit raw image data to a remote, interconnected (wired or wireless) processing device, such as a networked PC. In either arrangement, a vision system process 130 locates and resolves IDs, and feeds the data to a decoding process that outputs ID information (block 132). The data can be transmitted using a wired or wireless connection to a processing device and/or a process, such as a label printer, alarm or gating system that directs motion of a conveyed object based upon the information contained in the ID.

The imaged scene can be illuminated by an acceptable illumination unit or units. As shown, an exemplary illuminator 144 is mounted above the scene using a bracket (not shown) or other mounting arrangement. The illuminator(s) can be mounted separately from the reader assembly 110 as shown, and/or as an integral part of the assembly (for example as a ring illuminator arranged around the FOVE). The illuminator(s) are operatively connected to an illumination controller that can be triggered by the ID reader assembly 110 (e.g. the camera base processor) or by another processor (e.g. a PC interface).

The lens 120 can be any acceptable lens type, such as a fixed-magnification or variable-magnification (zoom) lens. The lens mount can be a conventional C-mount, F-mount, etc, or a custom mount, or a fixed lens. Alternate lens types, such as liquid lenses can also be employed. The lens 120 is positioned to receive light from a field of view expander (FOVE) 140 fixedly mounted with respect to the camera assembly 114 using an illustrative L-shaped bracket 142 that is the front part of the frame 116. A variety of frame assemblies can be used to physically interconnect the camera assembly 114 to the FOVE 140. In further embodiments, the FOVE can be integrally attached to the camera base and/or lens so that is defines an integral unit. The camera and FOVE are mounted using a bracket arrangement (not shown), such as an overhead bracket, so that the scene is imaged appropriately for the scanning operation. While the camera assembly and FOVE are typically fixed as shown, and objects move through the associated field of view, it is expressly contemplated that the objects or subjects can be fixed, and the camera assembly and FOVE can move on an appropriate track or other structure. Thus, as defined broadly herein, the camera assembly with FOVE and the object(s) are in "relative motion" with respect to each other.

That object 150 is represented, by way of example, by a box having a plurality of IDs (e.g. one-dimensional barcodes) 152, 154, 156 and 158 positioned at discrete locations across the width of the object 150. The object 150 moves (double arrow 156) on the conveyor 156 with respect to a field of view 158 generated by the FOVE 140. The field of view 158 is arranged to cover the width FOVW of the conveyor 112 and/or object 150. Likewise, the height FOVH of the field of view is arranged to image the area of the object expected to contain IDs. While a single object crossing the width of the line is shown by way of example, the term "object" can be taken broadly to comprise a plurality of objects arranged side by side across a width of a line. Likewise an object can be a longer structure (e.g. a web) having a multiplicity of IDs or other features of interest therealong.

In various embodiments, it is desirable to define the field of view so that the height is smaller than the width, and more generally the height is reduced from that provided in a typical 1024×768 pixel sensor. In this manner, any IDs passing into the field of view will reside in a minimal number of image frames, reducing the possibility of a double inclusion of the object in the output data. Illustratively, an ID-reading application can sometimes be more effectively implemented if the sensor defines 2048×384 pixels or 2048×768 (at a lower frame rate) instead of the standard 1024×768. That is, it can be desirable to provide a sensor that is N times as wide, and illustratively one-Nth as tall, as a standard unit. Such an arrangement can be particularly useful in reading the one-dimensional bar codes 152, 154, 156 and 158 in known widthwise orientation across the conveyor 112, as depicted in FIG. 1. Through use of the FOVE according to various embodiments herein a sensor with roughly square aspect ratio can be modified into a "virtual sensor" which is much wider and possibly narrower (but with the same overall number of pixels) so that a wide, but narrow strip across the field of view is imaged. Based upon the structure and function of the FOVE according to various embodiments herein, this strip is imaged in a manner that is free of loss of the resolution per-unit-area of the object when compared to an unmodified sensor without (free of) the FOVE.

More particularly, and as shown in FIG. 1, the effect of the FOVE 140 of the illustrative embodiment is to provide the two depicted fields of view 160 and 162 that cover the width of the object 150 and/or conveyor 112 with a sufficient height to fully image an ID (barcode) within a given acquired image frame. The overlap region OR is variable and ensures that the largest expected feature is within one or both of the defined fields of view 160, 162. In this example, the size of the overlap region OR is larger than the largest ID (e.g. center ID 158) so that this feature is fully imaged.

Figure 1A:
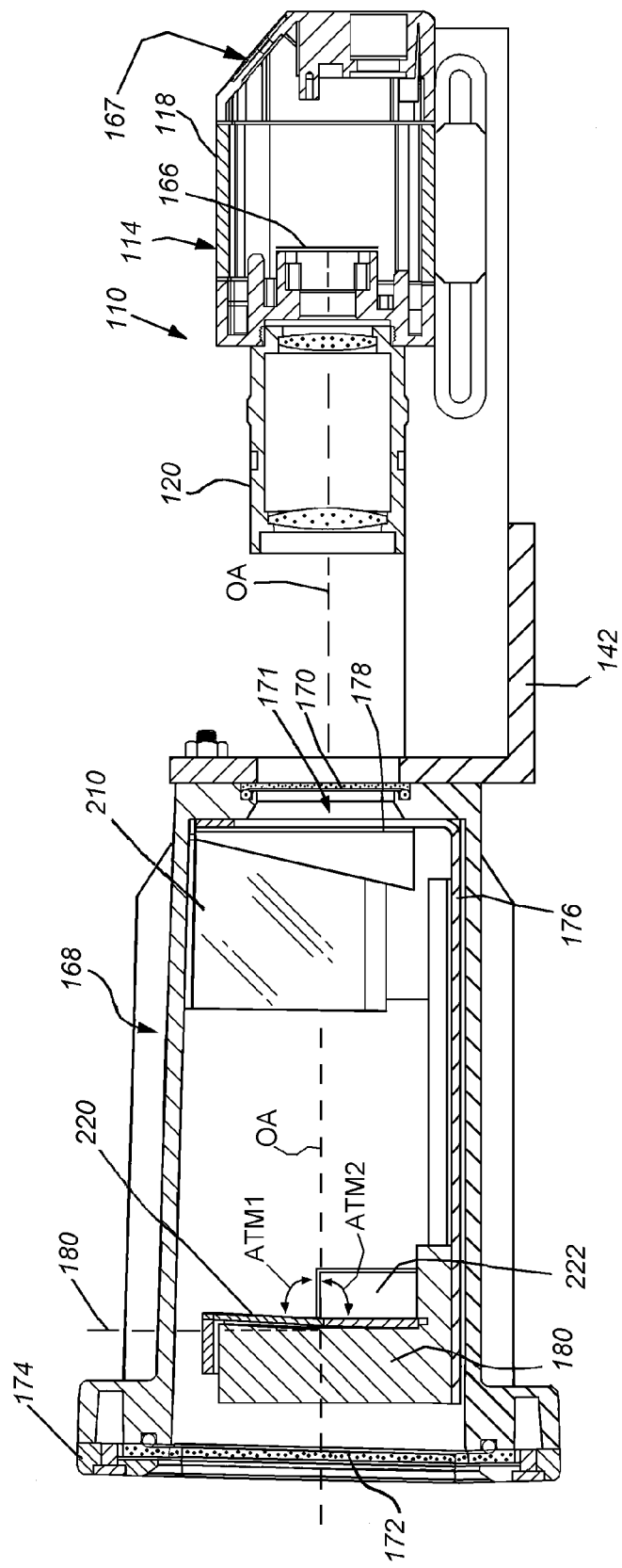
FIG. 1A is a side cross section of the vision system and FOVE of FIG. 1.

With further reference to FIG. 1A, the internal structure of the FOVE 140 and an exemplary vision system camera assembly 110 is shown in cross section. The camera base 118 includes a sensor 166 in optical communication with the lens 120 and FOVE 140. The sensor is interconnected with onboard and/or remote processing components (not shown) as described generally above. The rear panel 167 of the camera base 118 includes various interface controls and connectors in an illustrative embodiment.

The FOVE 140 in this embodiment consists of an outer shell 168 illustratively constructed from an appropriate metal, polymer or composite. It can include various ribs (e.g. crossing ribs 169) that stiffen and lighten the shell 168. A transparent window 170 covers and seals the rear aperture 171 of the shell to allow light to pass into the lens 120. The front end of the shell is covered by a front transparent window 172 that is secured by a front bezel 174. The shell encases a support plate assembly 176 that extends along a bottom side of the shell and includes a reinforced upright plate that surrounds the aperture 171 (allowing light to pass therethrough), and is secured to the rear face of the shell. The support plate assembly 176 supports the mirrors employed to expand the field of view in accordance with the illustrative embodiment.

Figure 2:
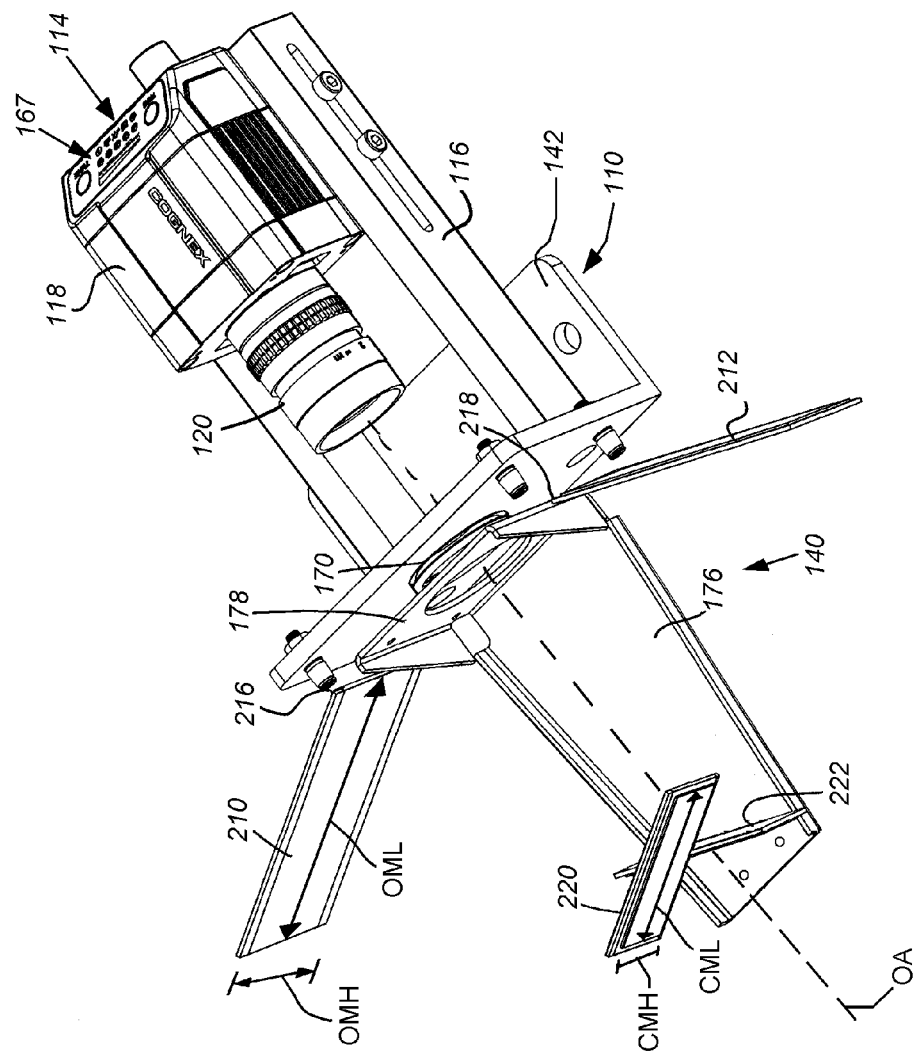
FIG. 2 is a more detailed perspective view of a mirror arrangement in the illustrative vision system and FOVE of FIG. 1 with housing and support components omitted to depict the relative placement of mirrors therein.
Figure 3:
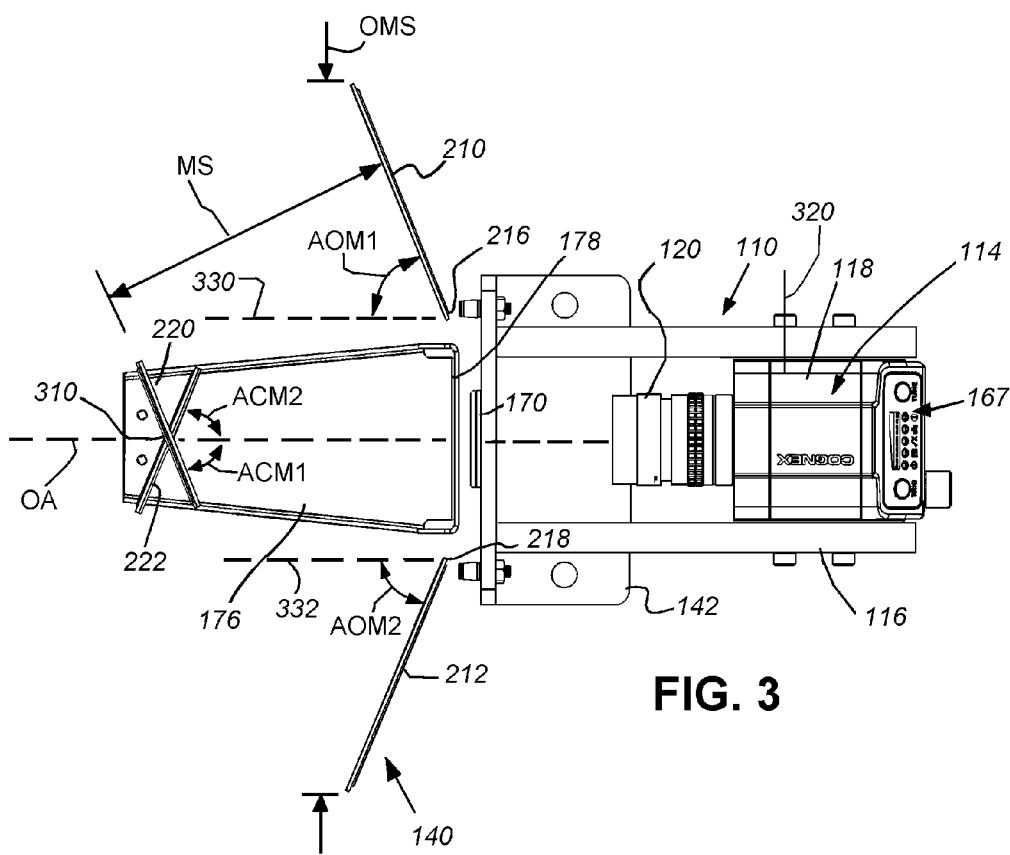
FIG. 3 is a top view of a mirror arrangement in the illustrative vision system and FOVE of FIG. 1 with housing and support components omitted.
Figure 4:
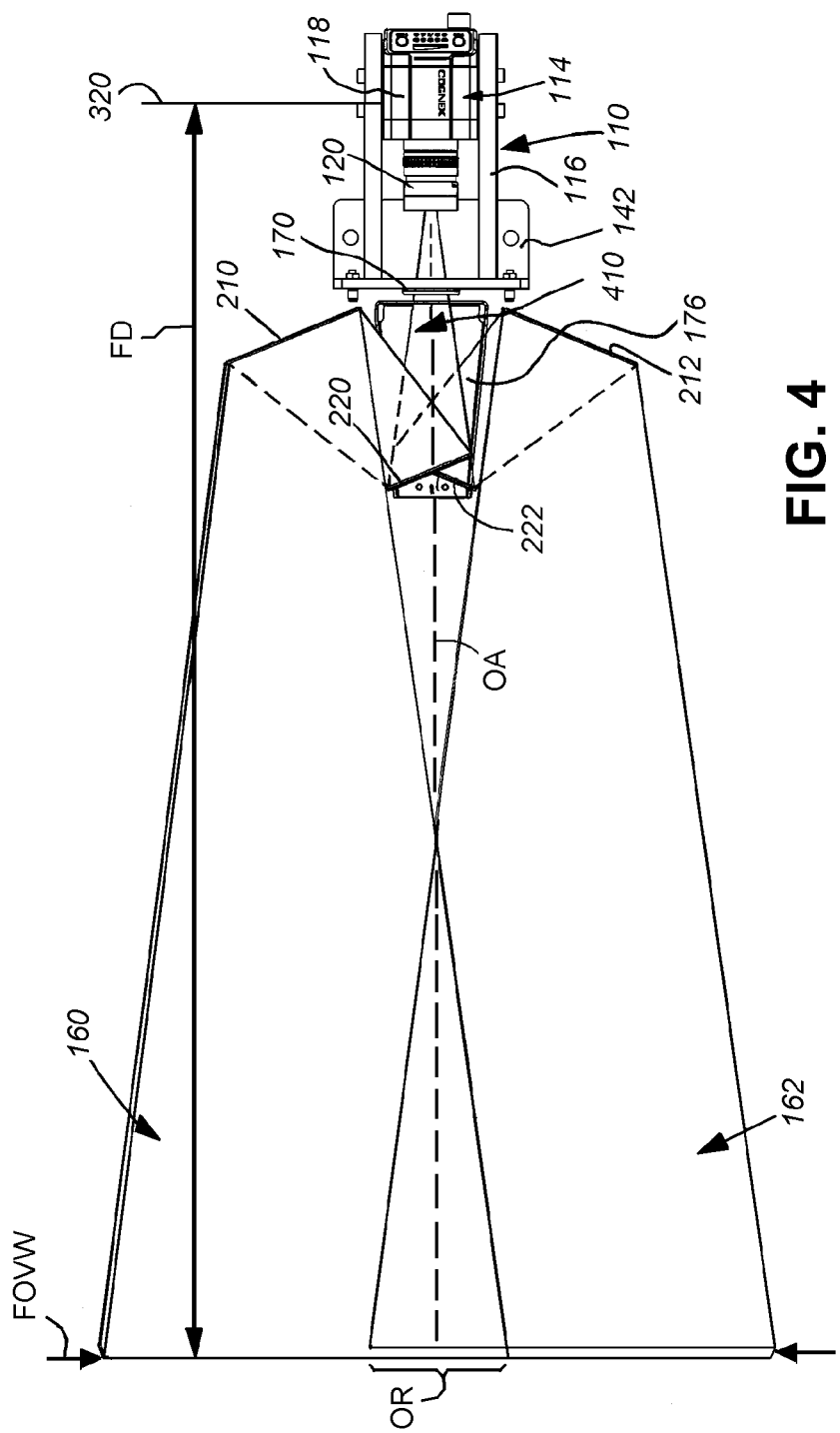
FIG. 4 is a top view of a mirror arrangement in the illustrative vision system and FOVE of FIG. 1 with housing and support components omitted showing the relative angles of received light transmitted from an object, through the FOVE, to the camera.
Figure 4A:
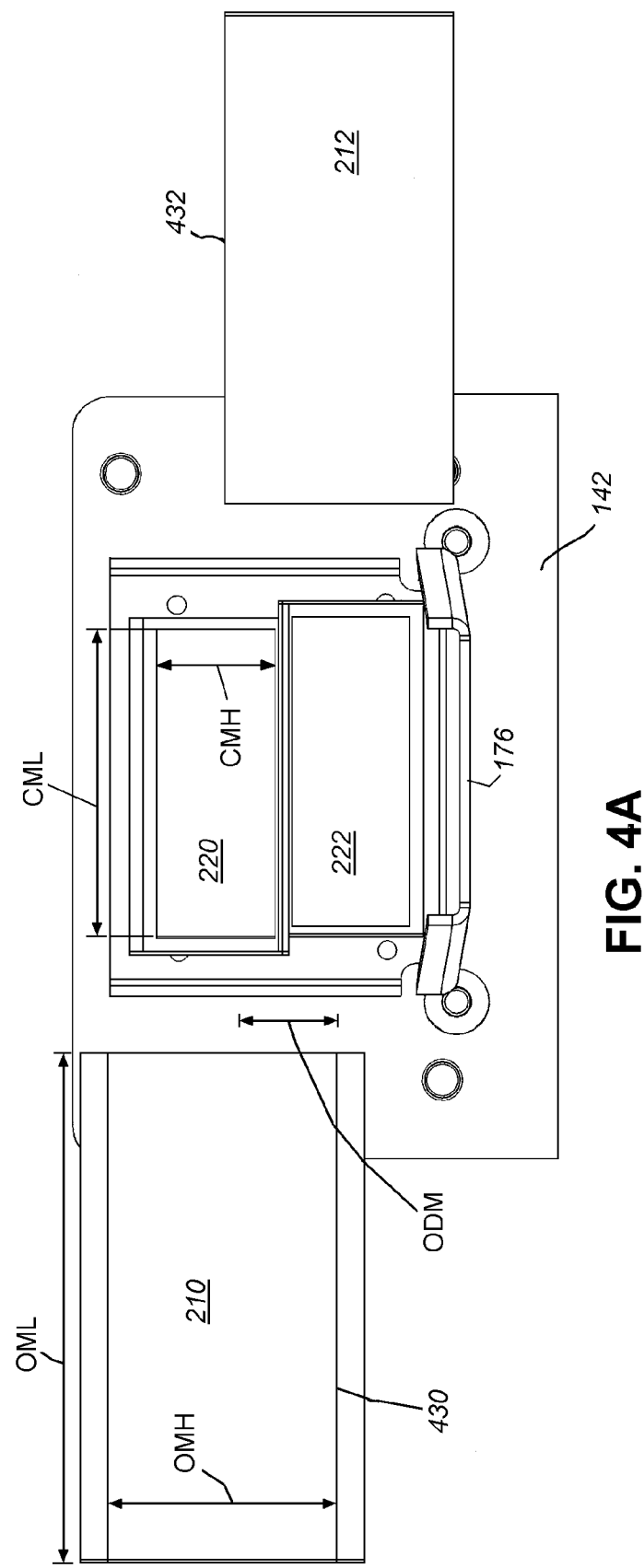
FIG. 4A is a front view of the mirror arrangement of the FOVE of FIG. 1

With further reference to FIGS. 2-4, the placement and function of the mirrors is described in further details. The support plate assembly 176 secures a pair of opposing outer-extended mirrors 210 and 212 that each respectively extend from a position 226 and 218 near each side the rear aperture to a respective side edge of the shell (168 in FIGS. 1 and 1A). Likewise two, vertically stacked, crossing inner mirrors 220 and 222 reside on a mount (180 in FIG. 1A) centered about the optical axis OA. Illustratively, the inner mirrors' crossing line 310 (FIG. 3) is arranged along the axis OA. As described below, the mirrors have a vertical tilt so the crossing "line" is an approximate region that is generally/approximately vertical and generally/approximately resides around the axis OA. Note also, as used herein various directional and orientation terms such as "vertical", "horizontal", "up", "down", "bottom", "top", "side", "front", "rear", "left", "right", and the like are used only as relative conventions and not as absolute orientations with respect to a fixed coordinate, such as gravity.

In this embodiment, the outer mirrors 210 and 212 are directed to receive light from a scene through the front window (172 in FIG. 1A). In this embodiment they are each oriented at a respective acute angle AOM1 and AOM2 relative to a line (dashed lines 330 and 232 parallel to the axis OA) in FIG. 3 that generates the desired expanded, overlapping field of view at a given focal distance FD from the sensor image plane 320 (see also FIG. 4). As shown in FIG. 4, the crossing inner mirrors 220 and 222 define, in essence a "beam splitter", which reflects the light transmitted from the outer mirrors 210 and 212 into an overlapping wedge (frustum) 410 that is aligned with the axis OA of the lens and camera and substantially perpendicular to the sensor image plane. This is desirable in that ensure that light received from each field of view is relatively free of distortion when it reaches the sensor. That is, light that reaches the sensor at an angle can provide a distorted image that is moiré difficult to analyze and decode.

To provide an axially aligned image at the lens and sensor, the crossing inner mirrors 220 and 222 are each oppositely angled with respect to the axis OA at respective angles ACM1 and ACM2. In an illustrative embodiment angles AOM1 and AOM2 are in a range of approximately 45 to 75 degrees, and typically 68 degrees, while angles ACM1 and ACM2 are typically in a range of 45 to 75 degrees and typically 68 degrees. Thus, in an embodiment, the crossing inner mirrors of the beam splitter define substantially equal opposite angles with respect to the optical axis. Also, in an illustrative embodiment (referring to FIG. 2), outer mirrors 210, 212 each have a horizontal length OML of between 40 and 120 millimeters, and typically 84 millimeters, and a vertical height OMH of between 20 and 50 millimeters, and typically 33 millimeters. Likewise, the crossing inner mirrors 220, 222 illustratively have a horizontal length CML of between 30 and 60 millimeters, and typically 53 millimeters, and a vertical height CMH of between 10 and 25 millimeters, and typically 21 millimeters. The overall horizontal span OMS of the outer mirrors 210, 212 (referring to FIG. 3) is approximately 235 millimeters in an illustrative embodiment, and the spacing MS between each respective outer and associated inner mirror surface (i.e. 210 and 220; 212 and 222) is approximately 100 millimeters. Based upon the forgoing measurements and with appropriate focus adjustment in a selected camera lens 120, an overall expanded field of view FOVW of approximately 381 millimeters (15 inches) can be achieved at a focal distance FD of approximately 700 millimeters.

While the foregoing angles and dimensions are provided in an illustrative embodiment, these are only exemplary and a wider or narrower field of view that can be achieved. Likewise the measurements can be varied in accordance with skill in the art to achieve similar results and can be either symmetrical (e.g. equal opposing angles and/or equal dimensions) with respect to the axis OA or asymmetrical (e.g. unequal opposing angles and/or unequal dimensions). For example the size of any mirror can be increased or decreased and their angles with respect to the axis OA can be varied as appropriate.

Additionally, the mirrors can be constructed from any acceptable specular material that produces the desired optical effect. For example, a silvered glass mirror or an equivalent polymer can be employed. Other specular materials, such as highly polished or coated metals can be used in certain embodiments.

With reference also to the front view of FIG. 4, the outer mirrors 210 and 212 are positioned at a vertical offset with respect to each other, and relative to the overall height of the shell (See FIG. 1A). In this manner, each outer mirror 210, 212 is aligned more vertically with its associated inner mirror, 220, 222. In an illustrative embodiment the offset distance ODM between the bottom edge 430 of the higher outer mirror 210 and the upper edge 432 of the lower outer mirror 212 is approximately 16 millimeters. This dimension can be varied in alternate embodiments depending, in part on the overall height of the outer mirrors and FOVE shell.

With reference again to FIG. 1A, the upper inner mirror 220 defines a tilt off the vertical (i.e. a vertical that is perpendicular to the axis OA shown by dashed line 180) that orients this mirror 220 tilt slightly downwardly and inwardly relative to the axis OA. The tilt is represented by an acute (slightly non-perpendicular) angle ATM1 which is approximately 88 degrees (and more particularly 87.9 degree) in an illustrative embodiment. Likewise, the lower inner mirror 222 tilts slightly inwardly and downwardly by an opposing angle ATM2 of approximately is approximately 88 degrees (and more particularly 87.9 degrees) with respect to the axis OA in an illustrative embodiment. The overall geometry of the mirrors resolves the two side-by-side overlapping fields of view into a pair of slightly overlapping, strips that are received by the lens and sensor as a stacked pair of views. As described above the stacked images are substantially axially aligned with the optical axis OA along the horizontal plane, and slightly angled with respect to the vertical plane (due to the tilt of the crossing mirrors) resulting in a relatively distortion-free image.

In an illustrative embodiment, the mirror arrangement of the FOVE, in accordance with the exemplary geometry and dimensions described above, is generally rotationally symmetric with respect to the optical axis OA.

Figure 5:
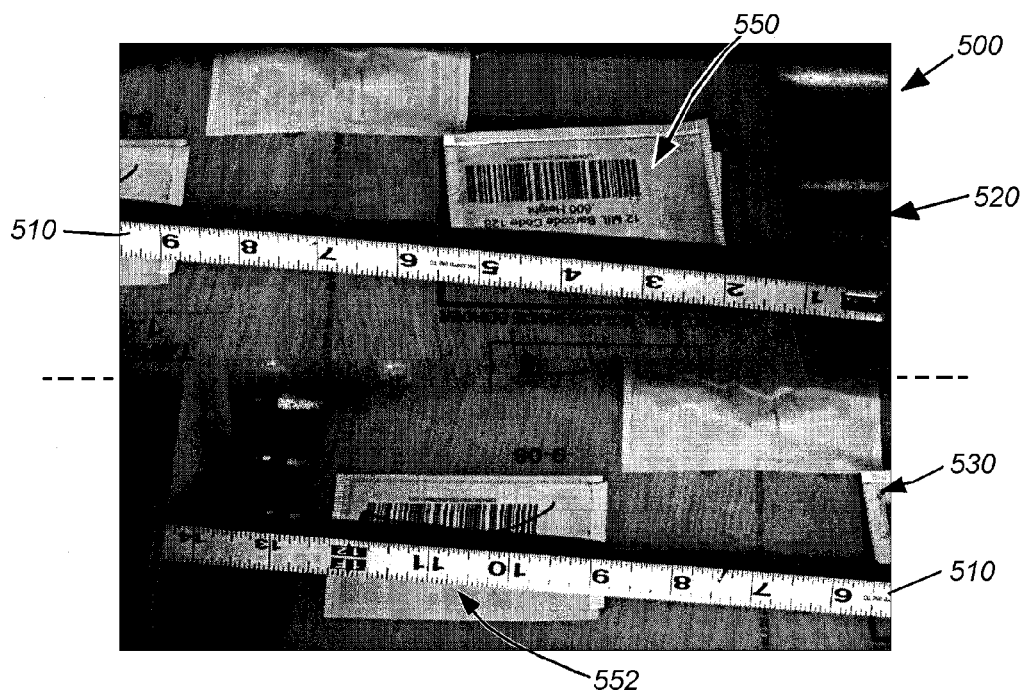
FIG. 5 is a depiction of an acquired image of an exemplary object including a pair of exemplary IDs each respectively located within each discrete field of view portion of the illustrative vision system and FOVE of FIG. 1.
Figure 6:
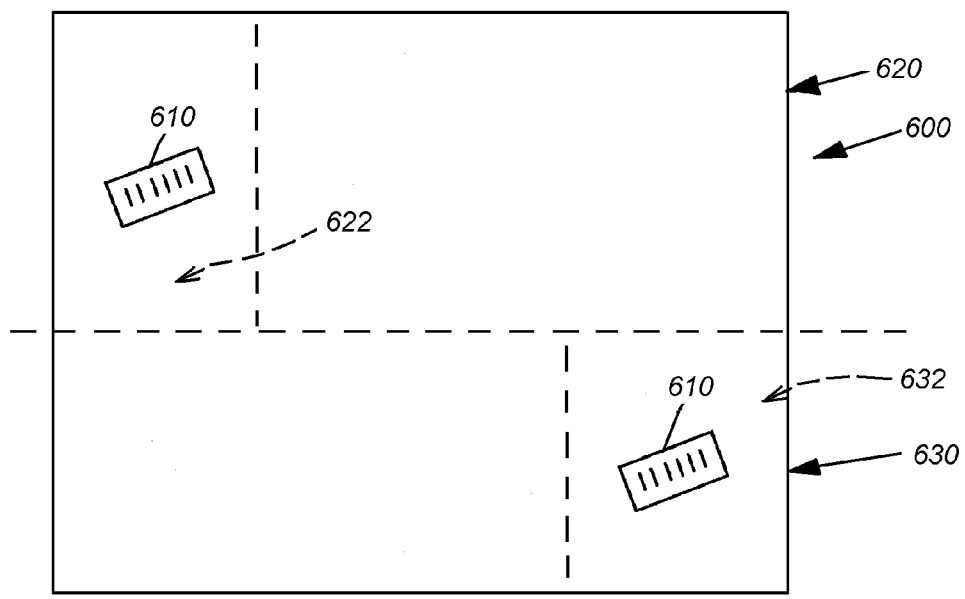
FIG. 6 is a diagram of an acquired image of an exemplary object including a discrete exemplary ID located within an overlap region within each discrete field of view portion of the illustrative vision system and FOVE of FIG. 1.
Figure 7:
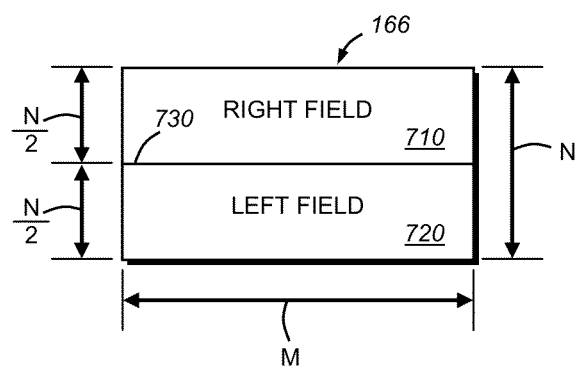
FIG. 7 is a diagram of an exemplary sensor divided between an upper strip that images the right field of view and a lower strip that images the left field of view based upon the division of the field of view provided by the illustrative FOVE of FIG. 1.

Reference is now made to FIGS. 5-7, which show the resulting image received by the sensor based upon the optical arrangement of the FOVE according to the illustrative embodiment. As shown in FIG. 5, the resulting image 500, in which the overall width of the field of view is represented by a ruler 510 includes a top portion 520 that constitutes the right side (with ruler inch-gradations 1-9) and a bottom portion that constitutes the left side (with ruler inch gradations 6-14). A narrow blended horizontal dividing line (in the region of dashed line 540) is depicted between the image strips 520 and 530. This is a small region of optical overlap along the vertical direction that can vary in size based in part upon the degree of vertical tilt of the crossing mirrors 220, 222. As shown, the upper image strip 520 includes an ID 550 within its full field of view. Likewise, the lower image strip 530 also includes a separate ID 552 within its full field of view. Both IDs provided across a wide field of view have been effectively imaged and the overall height dimension has been reduced to minimize excess information in the height direction while still providing sufficient space to fully image the ID. As described above, this narrowed height serves to reduce the number of image frames that can capture the same ID, thereby reducing the risk of double readings of the same object.

The horizontal overlap is represented by the occurrence of inch gradations 6-9 in both the upper and lower image strips 520 and 530, respectively. This distance (about 3-4 inches) is sufficient to ensure that a centered ID of a certain size (e.g. 2-3 inches) is fully captured in at least one of the image strips 520, 530. An example of a centered ID 610 residing in the overlap region of each strip is shown in the diagram 600 of FIG. 6. This ID 610 is positioned similarly to the ID 158 in FIG. 1. In the diagram of FIG. 6, the ID 610 occurs in the left hand overlap region 622 of the upper strip 620. Likewise, in the lower strip 632, the centered ID 610 occurs in the right hand overlap region 632. As described, this region ensures that an ID will fall fully into at least one of the two strips so as to ensure positive identification by the vision system.

Briefly, FIG. 7 shows a conventional camera sensor 166 as described above. The transmitted light from the FOVE reaches the sensor, through the lens so as to define the depicted upper strip 710 and lower strip 720, in which the right side is radiated on the upper strip to be captured by its respective pixels, while the left field is radiated onto the lower strip to be captured on its respective pixels. A relatively narrow vertical overlap band can be defined at the strip boundary 730, where both the left and right fields are deposited. This information can be discarded by the vision system process. Alternatively, the optics of the mirrors can be arranged to define a dark band over a few rows of pixels to avoid confusion. More generally, the FOVE allows a sensor with an M (width)×N (height) pixel array to operate as a narrower 2M×N/2 sensor with no loss of resolution within the imaged area.

Figure 8:
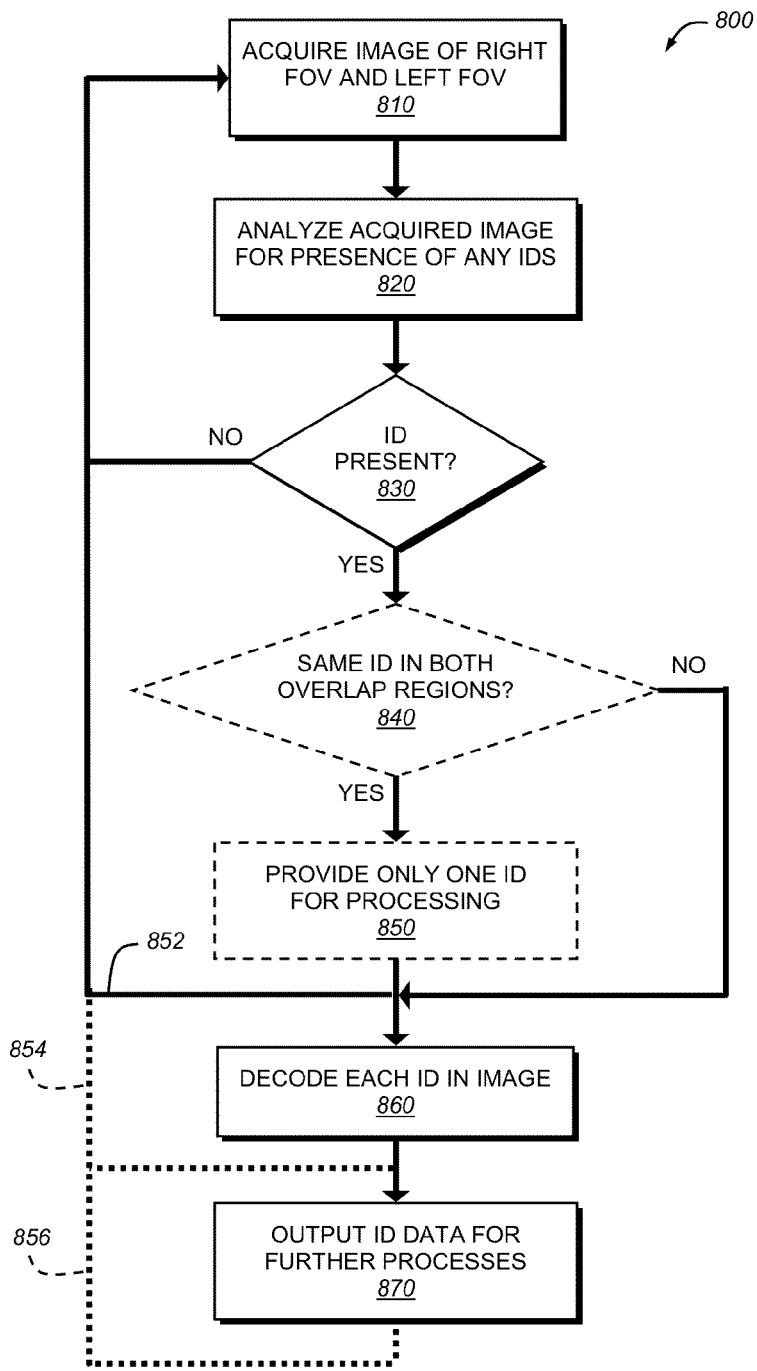
FIG. 8 is a flow diagram of a process for acquiring and decoding IDs using a vision system/ID reader including the illustrative FOVE of FIG. 1.

Reference is now made to FIG. 8 that describes a basic procedure 800 for locating and decoding IDs (or other features of interest) across an expanded width using a vision system with an FOVE according to an illustrative embodiment. In each image frame (depending upon the camera frame rate), the system acquires an image frame, which includes an upper strip and a lower strip (step 810). While not shown, image acquisition can be triggered based upon a presence sensor (e.g. a photodetector, line encoder or vision-system based detector) that senses and/or computes when an object comes into the field of view of the vision system. At such time the system begins acquiring image frames of the object. Each acquired image is then passed to an ID feature search and analysis process 820. This process searches the whole image without regard to its stripped nature for any ID-like features and returns likely candidates for further processing, until features with reasonably high confidence are provided for decoding in a further process. The ID feature search/analysis and decoding application(s) (i.e. software consisting of a non-transitory computer-readable medium of program instructions and/or hardware) to which the image data is directed can be any acceptable ID feature search, analysis and/or decoding application. The search for ID candidates can also be handled by a separate process or processor from decoding (which can be handled by a decoding DSP). Notably, because of the appropriately sized field of view with overlap region, the image can be processed free of any need to "stitch together" portions of it so as to provide a complete ID. Rather, a complete ID is expected to reside in some portion of the overall image and can be located by directly searching the image.

A variety of commercially available software and/or hardware systems can be employed to search analyze and decode IDs and other features of interest in an image frame as described herein. For example, such systems are available from Cognex Corporation of Natick, MA. As used herein the terms "process" and/or "processor" should be taken broadly to include a variety of electronic hardware and/or software based functions and components. Moreover, a depicted process or processor can be combined with other processes and/ or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

Further in the procedure 800 if no IDs are located in the acquired image frame by the search process 820, then the overall procedure 800 returns via decision step 830 to await the next acquired image frame in step 810. Conversely if any IDs are located in the image frame, then the decision step 830 branches to perform further process. An optional decision step 840 can determine whether the same ID exists (completely) in both the upper and lower overlap region. If so, it can filter the data to pass only one instance of the ID to speed processing (step 850).

Once ID data has been located and passed to further processing (that can be performed by downstream hardware and/or applications), the procedure 800 can branch back to step 810 to await the next set of image data for search and analysis (branch). Optionally, as indicated by dashed lines 854 and 856, branching back to step 810 can occur later in the process.

After providing ID data, the procedure 800 then decodes the located IDs using conventional or customized processes in step 860. The decoded data is then output to be stored and/or used by further processes in step 870.

Figure 9:
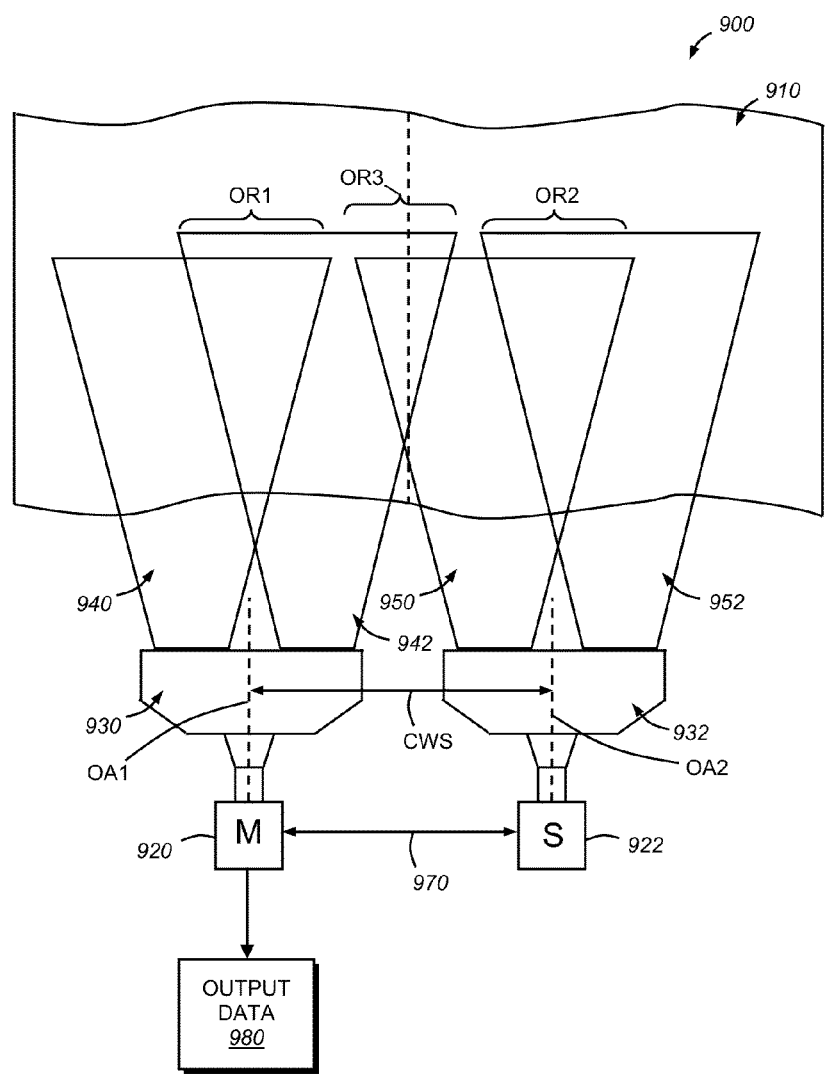
FIG. 9 is a top view of an interconnected arrangement of a plurality of ID readers to image a wide field of view each employing an illustrative FOVE according to an illustrative embodiment.

In certain applications, it can be desirable to increase the width of the field of view even further without loss of resolution within the imaged area. As shown in FIG. 9, an arrangement 900 allows a wide line 910 to be imaged free of loss of resolution within the imaged area. In this embodiment, two vision system camera assemblies 920 and 922 are provided in a side-by-side arrangement at an appropriate widthwise spacing CWS between respective optical axes OA1 and OA2. Each camera assembly 920, 922 includes a respective FOVE 930, 932, which can be constructed and arranged in accordance with the embodiment of FIGS. 1-4A described above. Each camera assembly 920, 922 and respective FOVE 930, 932 is mounted on an appropriate bracket assembly (not shown). The FOVE 930 defines a widened overall field of view with a left field 940 and a right field 942, which appears on the camera sensor as a pair of stacked strips as described above. The two fields 940, 942 include an overlap region OR1 sized to ensure inclusion of the largest feature of interest therein. Likewise the adjacent FOVE 932 defines a widened overall field of view with a left field 950 and a right field 952, which appears on the camera sensor as a pair of stacked strips as described above. The two fields 950, 952 also include an overlap region OR2 that is sized to ensure inclusion of the largest feature of interest therein. The spacing CWS between cameras 920, 922 is chosen to generate a third overlap region OR3 that is sized and arranged to ensure that the largest feature of interest resides fully within at least one adjacent field of view 942, 950 of a respective camera 920, 922.

There are a variety of techniques for searching and analyzing the received image data of the two cameras. In general a procedure 800 can be carried out within the processor associated with (or operatively connected with) one of the cameras using a master-slave interconnection 970 between cameras (commercially available on a variety of camera units, such as certain units manufactured by (Cognex Corporation). In such an arrangement, acquisition of concurrent image frames in both the master (M) and slave (S) cameras is triggered by the master (camera 920 herein designated M) and handling of image data is controlled by the master. In other arrangements, both the processors of the master and the slave can operate to locate and analyze IDs or other features of interest. One or both of the cameras are used to output resulting data (block 980) as described above.

II. Four-FOV, Eight-Mirror FOVE

Figure 10:
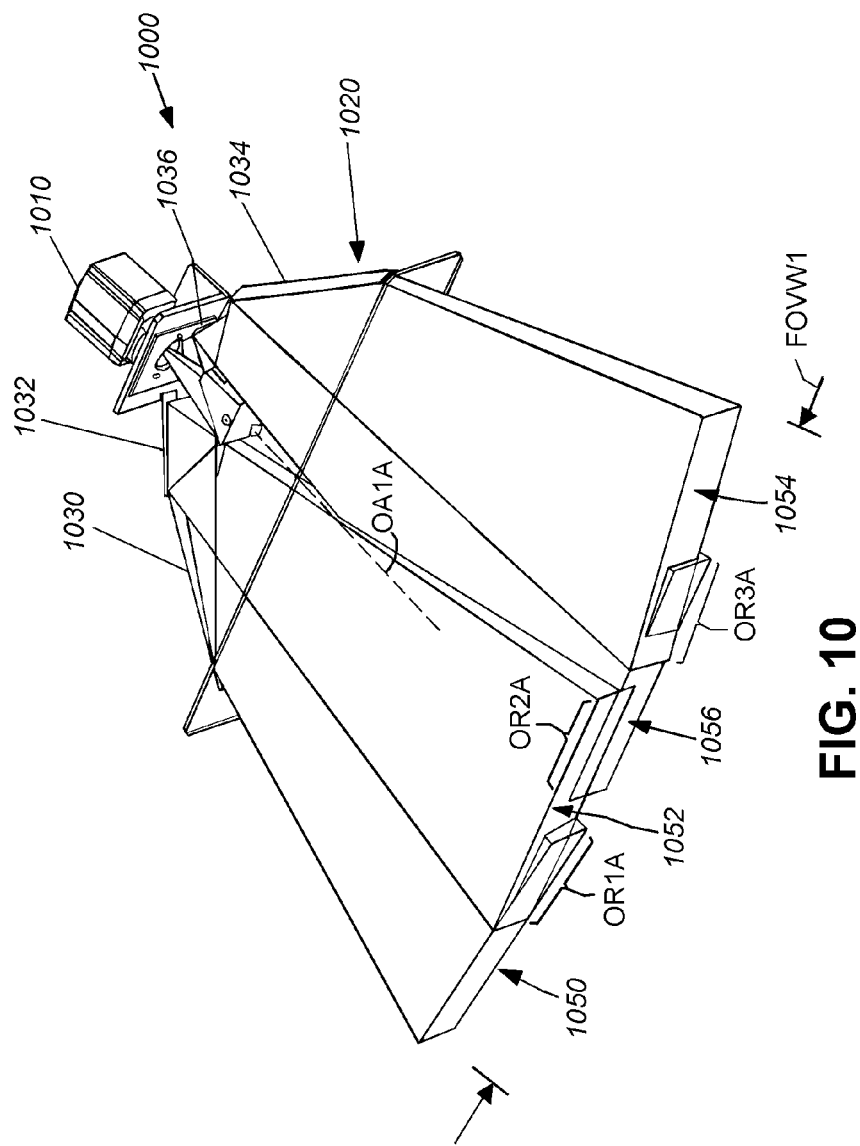
FIG. 10 is a perspective view of a vision system/ID reader including a FOVE according to an alternate embodiment in which four discrete strips relative to the image sensor.

In another embodiment, a wider field of view than that obtained with the FOVE of FIGS. 1-4A can be achieved using a single camera assembly 1010 in the arrangement 1000 of FIG. 10. As shown, the FOVE 1020 (with shell removed for clarity) includes four discrete outer mirrors, with two positioned on each side of the optical axis OA1A 1030, 1032 and 1034, 1036. Each mirror is oriented at a discrete angle with respect to the optical axis, with the outermost mirror pair 1030 and 1034 having a smaller angle than the innermost mirror pair 1032 and 1036. The relative angles of each of the outers mirrors 1030, 1032, 1034 and 1036 are each highly variable and in general are constructed and arranged to define the four fields of view 1050, 1052, 1054 and 1056, respectively that span the width of an expanded field of view FOVW1. Adjacent fields of view have appropriately sized overlap regions for reasons described above. That is, adjacent fields 1050 and 1052 define overlap region OR1A, fields 1052 and 1056 define overlap region Or2A and fields 1056 and 1054 define overlap region OR3A. The outer mirrors can be located at higher or lower positions vertically with respect to the optical axis OA1A. They reflect light from the scene into a "beam splitter" That can consist of four stacked, angled and vertically tilted mirrors arranged similarly to that of the FOVE described in FIGS. 1-4A. The resulting split image provides four stacked strips upon the sensor of the camera 1010. In an embodiment, the strips divide the image of an M×N sensor into a 4M×N/4 wide image. Desirably, the arrangement of the outer mirrors and beam splitter mirrors allows each image strip to be substantially aligned (along the horizontal plane) with the optical axis for minimum distortion thereof This approach is effective so long as the line speed is slow enough and/or the frame rate of the camera is high enough to ensure a relatively complete ID or other feature of interest can be acquired in the relatively narrow-height strip of the expanded field of view.

III. Moving Mirror FOVE

Figure 11:
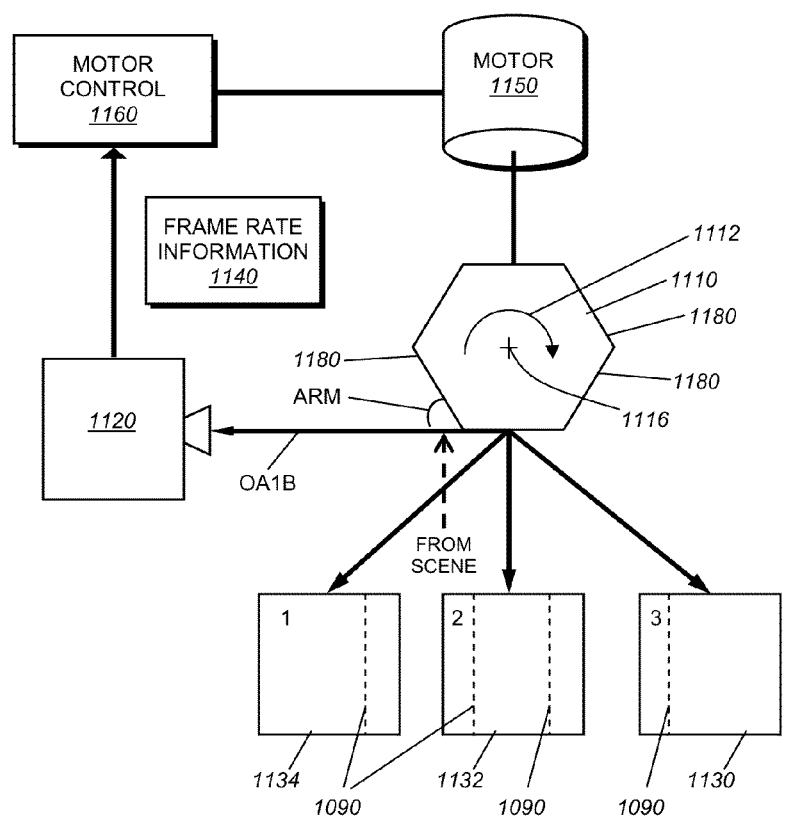
FIG. 11 is a schematic diagram of a rotating, polygonal mirror used to acquire a plurality of image frames across an expanded field of view.

In further alternate embodiments, an FOVE can be implemented using a moving mirror arrangement in optical communication with the camera assembly. As shown in the schematic diagram of FIG. 11, a polygonal, rotating (curved arrow 1112) mirror 1110 can be employed to provide a sequence of full resolution images across the width of the object having a wider profile that the original field of view than the camera assembly 1120. The rotation is along an axis 1116 generally perpendicular to the horizontal plane of the field of view though the optical axis OA1B. Each reflecting surface on the polygonal mirror is typically (but not necessarily) substantially perpendicular to the horizontal plane and parallel to the axis of mirror rotation 1116. In general, a sequence of images 1130, 1132, 1134 is acquired in (for example) a sequence of images to be taken which look at neighboring regions of the overall width of the scene. In general, frame rate information 1140 can be transmitted from the camera assembly to synchronize operation of the mirror drive motor 1150 under control of a motor control circuit 1160 of appropriate configuration. For example, a stepper motor can be used to accurate step through a sequence of positions that place each of the mirror surfaces 1180 at an appropriate angular orientation to reflect back an optically aligned (i.e. aligned with the camera optical axis OA1B) image of a portion of the width. In an embodiment, the mirror has a regular polygon shape and the angular orientation of each surface (angle ARM) varies upon acquisition of each image frame so as to achieve a sequence of images across the width of the scene. In other words Frame 1 is taken at a 38-degree relative angle ARM, frame 2 is taken at a 45 degree relative angle ARM and frame 3 is taken at a 52 degree angle. In another embodiment, the polygon is irregular ad the motor steps stop at regular degree intervals, in synchronization with the frame rate so that each step exposes a slightly differently angled face of the polygon to the optical axis. This synchronization essentially generates an approximately constant pattern of varied angular orientations in a sequence. Each image can define an appropriate overlap region along an adjacent edge with another image, the size of which in the widthwise direction is sufficient to ensure that an ID or other feature of interest fully resides within the overlap region of one of the images. The overall width of the field of view is highly variable. Each image can be independently search and analyzed for IDs or other features without regard to other images in the sequence (i.e. free of the need to stitch together the overall image). Thus, the motion of the object in the drive direction should not affect the ability of the system to resolve any IDs so long as the full width of the object can be imaged while an ID remains within the height of at least one of the images. In another embodiment, where the frame rate is sufficiently high, the mirror can be slightly asynchronous with frame rate and a large sequence of images at a number of differing orientations can be acquired in a possibly random sequence. In any embodiment, a boundary can limit the maximum field of view to the desired width so that only light from the object within the defined field reaches the camera.

In another embodiment, an oscillating mirror (not shown) can be used as a "moving" mirror. The oscillating mirror can be a micro mirror that moves (rotates along an axis perpendicular to the horizontal plane) between different angular orientations with respect to the camera optical axis so that different portions of the overall field of view are imaged. The motion of the mirror can be synchronous or asynchronous with respect to the object.

IV. FOVE Additional Features

Figure 12:
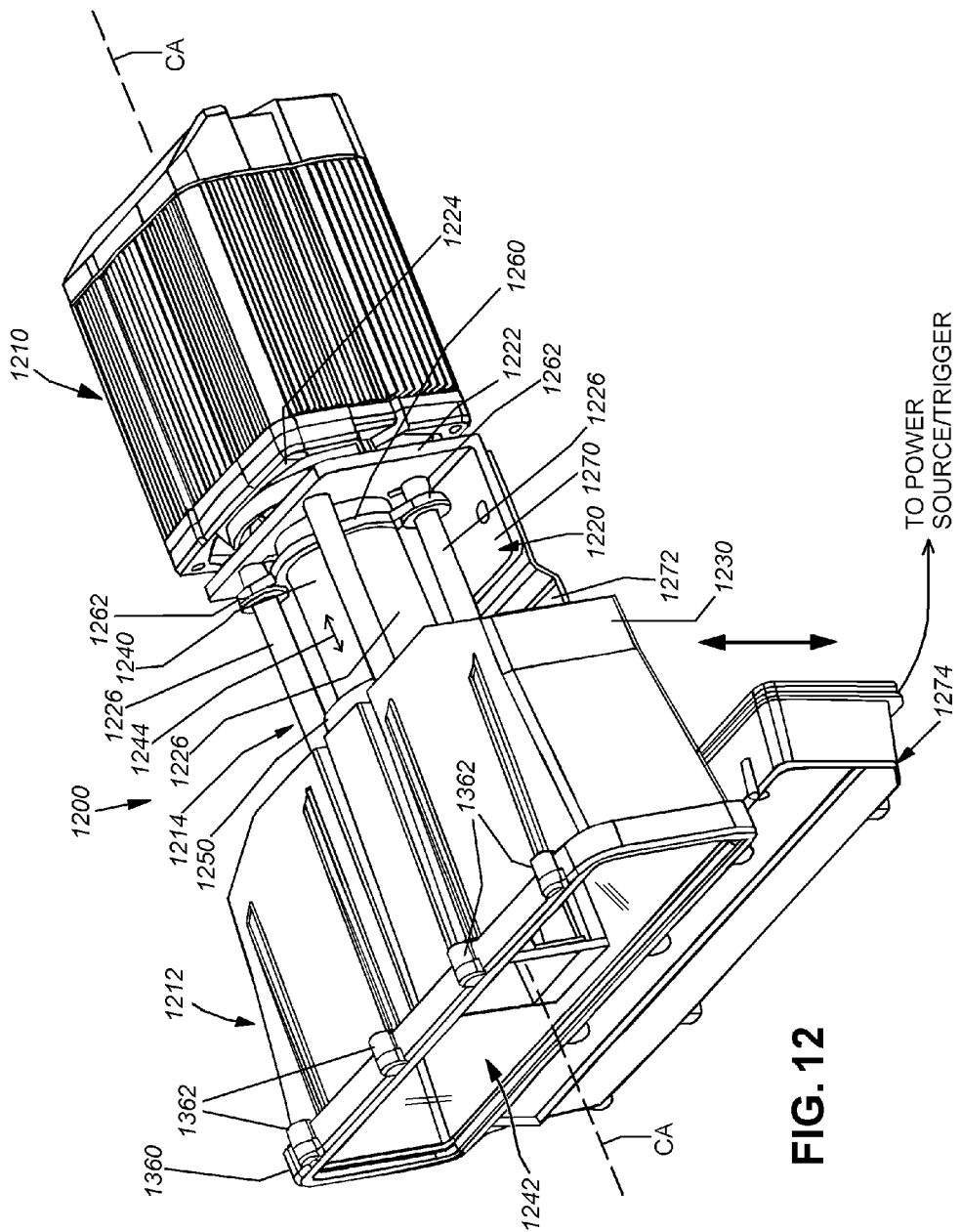
FIG. 12 is a front perspective view of a vision system including an FOVE according to a further illustrative embodiment, having optics arranged generally according to the embodiment of FIG. 1, and including an optional removably mounted illumination assembly.

A variation of the above-described vision system and FOVE (FIG. 1) is shown with reference to FIG. 12. This vision system 1200 includes a vision system camera assembly having an acceptable size, shape, lens arrangement and performance characteristics. In an embodiment and by way of useful background information a camera assembly is shown and described in commonly-assigned U.S. patent application Ser. No. 13/645,173, entitled SYMBOLOGY READER WITH MULTI-CORE PROCESSOR, by Laurens Nunnink, et al, filed on even date herewith, and commonly assigned U.S. patent application Ser. No. 13/645,213, entitled SYSTEM AND METHOD FOR OPERATING A SYMBOLOGY READER WITH MULTI-CORE PROCESSOR, by Mario Joussen, et al, filed on even date herewith, the teachings both of which applications are expressly incorporated herein by reference. This camera assembly 1210 optionally employs an auto-focusing lens based upon a commercially available liquid lens component. The lens assembly is described further below.

Illustratively, the camera is attached to the FOVE assembly 1212 by an intermediate coupling assembly 1214 that aligns the FOVE with the optical axis of the camera assembly. The coupling assembly 1214 includes an L-shaped bracket 1220 that can be constructed from a sturdy material, such as aluminum alloy. The bracket 1220 includes a vertical face 1222 engaging the camera using, for example threaded fasteners (described further below) that seat into threaded holes in the front face 1224 of the camera assembly 1210. Standoffs/spacers can be used to space the vertical face 1222 from the camera front face at a desired spacing distance. The vertical face 1222 of the bracket 1220 is secured by fasteners (1310 in FIG. 13) to four metal (e.g. steel, aluminum or composite) posts 1226 that extend from the vertical face 1222 to the rear end of the FOVE housing 1230. These posts are secured to the housing by threaded fasteners (not shown, that pass trough the inner wall of the housing rear. The coupling 1214 thereby provides a rigid alignment between the camera assembly 1210 and FOVE 1212 along the camera optical axis CA.

In addition to providing a rigid, open framework structure, the posts 1226 allow several centimeters (e.g. approximately 4-5 centimeters) in length (along the optical axis) of clearance to access the lens shroud assembly 1240. This length is longer than a standard C-mount lens. The shroud assembly is constructed from an aluminum or polymer tube and serves to cover the underlying lens assembly against dust and other environmental contaminants. This provides a fully sealed optical system between the front transparent window 1242 of the FOVE 1212 and the front face 1224 of the camera assembly 1210. The shroud is movable (double arrow 1244) between a position in which it sealingly engages the bracket vertical face 1222 and a rear flange 1250 on the rear of FOVE housing 1230. The barrel shroud 1240 includes seals (e.g. lubricated natural rubber O-rings) on each end that each seal against the inner perimeter of the port formed in the vertical face 1222 and flange 1250, respectively. The shroud assembly 1240 is attached to a slider 1260 that is secured to the shroud's perimeter. The slider 1260 includes two opposing bushings (constructed from a low-friction material such as Teflon or Delrin), which allow for ease and accuracy of movement of the shroud assembly along the posts. In operation, the shroud assembly 1240 can be moved out of the depicted sealed and covered arrangement to a position in which it telescopes into the rear end of the FOVE housing, thereby revealing an underlying camera lens assembly (having a smaller diameter than the inner diameter of the shroud). When exposed by sliding back the shroud, the lens can be adjusted for focus, aperture, etc. by moving conventional adjustment rings thereon. In an embodiment the shroud is constructed to cover a C-mount lens or smaller, but other types of lens can be accommodated with appropriate sizing of the shroud 1240.

The bracket 1220 also includes a bottom plate 1270 that is adapted to secure a forwardly extended bracket 1272 as an option. This bracket allows the removable mounting of (for example) a bar illuminator 1274 using a variety of attachment techniques including clips, fasteners, and the like. The illuminator (or multiple illuminators) 1274 can be electrically connected with a triggered power source carried on the camera assembly or an external device.

Figure 13:
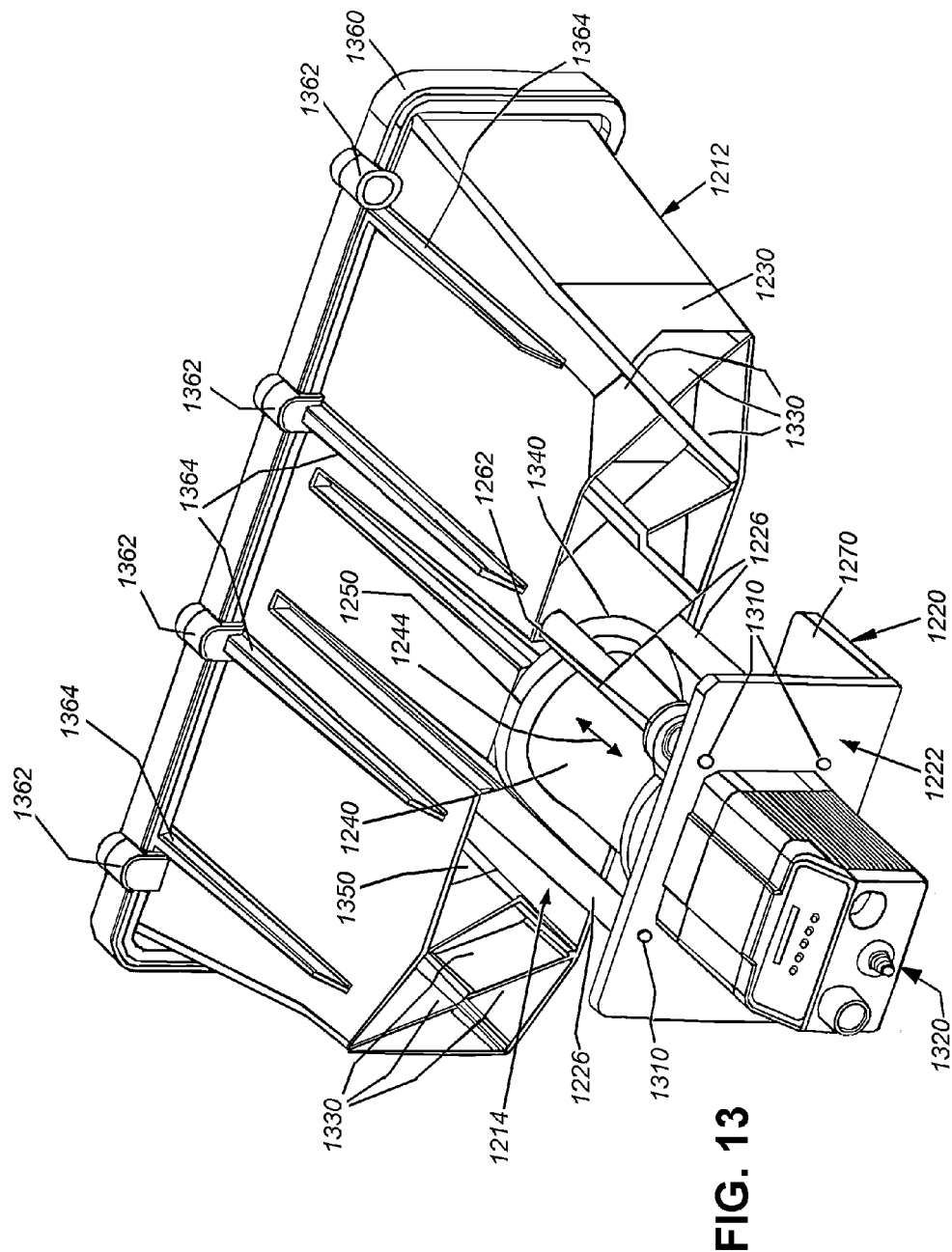
FIG. 13 is a rear perspective view of the vision system and FOVE of FIG. 12.

With reference particularly to FIG. 13, a differing (smaller) camera assembly 1320 is shown mounted to the vertical face 1222. This camera assembly employs appropriate mounting fasteners and accompanying holes (not shown) to be joined to the coupling 1214. Also depicted are a series of crossing ribs 1330 (also described above) on the rear side of the housing 1230. These ribs 1330 are disposed within recesses on each side of the housing 1230. The ribs can be between approximately 1 and 4 centimeters in height and approximately 2 to 5 millimeters thick. These ribs 1330 support each angled mirror carrying surface 1340 and 1350. In this manner, mirrors attached to the interior face of each surface 1340, 1350 maintain a relatively stable compound tilt angle with respect to the camera axis (the illustrative tilt geometry being described above with reference, for example, to FIG. 3). Notably, the housing is constructed from a unitary member using a molding technique, such as injection molding with a durable, stable material, such as commercially available glass-filled polycarbonate. In particular this material advantageously minimizes dimensional tolerance due to shrinkage during the molding process. The front rim 1360 of the housing is attached by fasteners that pas into a series of bases 1362. A series of unitary stiffening rips can extend rearwardly from each base 1362 (or another location) along the top (and bottom-not shown) of the housing 1230. To provide further rigidity to the unit. Other molded shapes and structures can be provided to the exterior and/or interior of the housing to achieve desired structural and/or aesthetic effects.

V. 90-Degree FOVE

Reference is now made to FIGS. 14-20, which variously detail a further embodiment of an FOVE for use in a vision system as contemplated herein. In various applications it is desirable to provide a wider field of view. Thus, while the above-described FOVEs of FIGS. 1 and 12 are adapted for a field of view (e.g. conveyor width) in the range of approximately 15 inches, it is often desirable to image wider scenes (e.g. approximately 25 inches). In addition in certain applications space can be more limited and thus the use of a long and wide FOVE attachment can be undesirable—for example when imaging the side of a box on a conveyor line. Thus the ability to rotate the optical path so that the field of view is at a right angle to the elongated length of the camera assembly and associated FOVE can be advantageous. In particular this can allow the camera assembly and FOVE to extend lengthwise along the running direction of the conveyor line taking up less lateral space.

Figures 14, 14A:
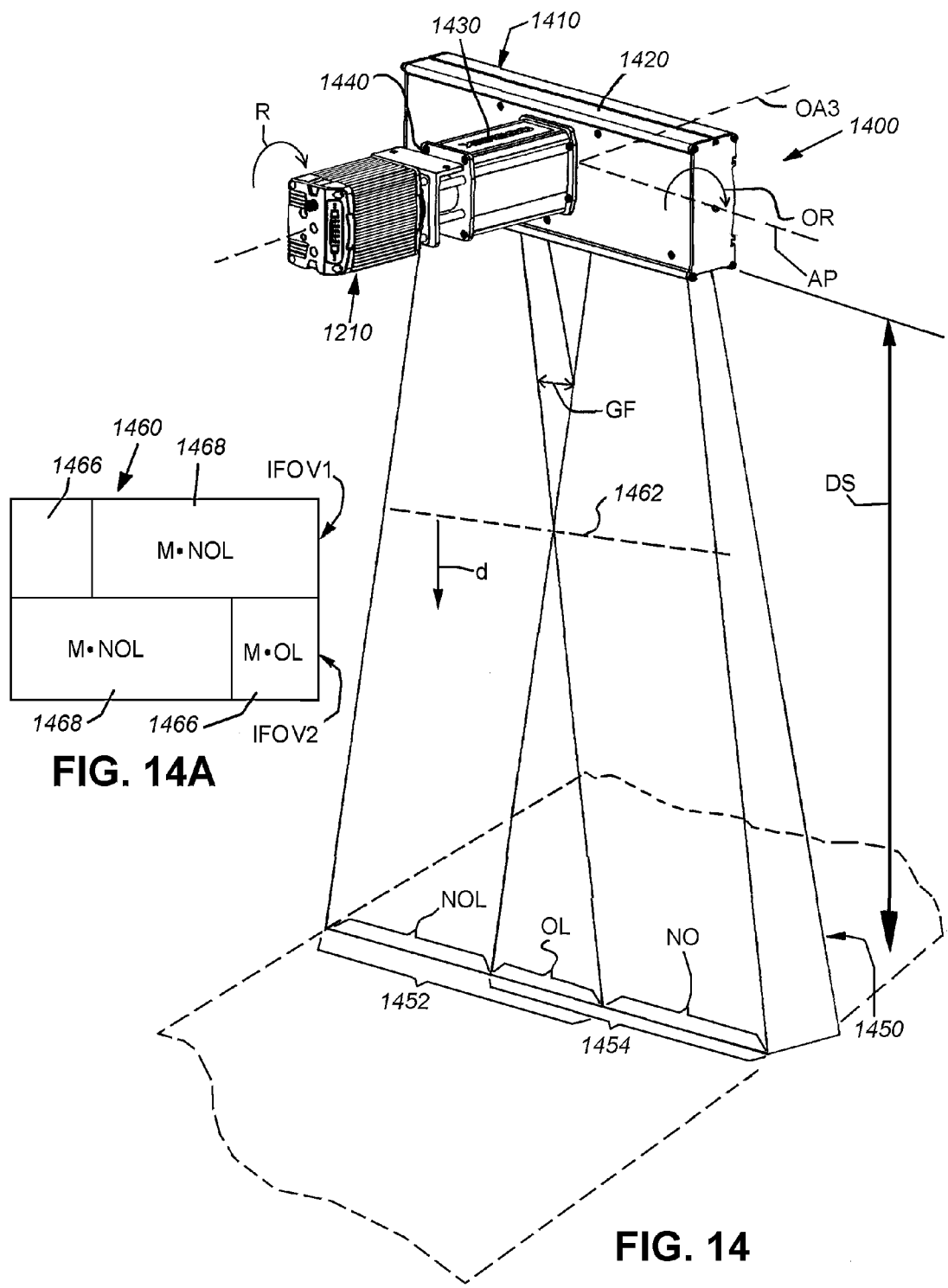
FIG. 14 is a rear perspective view of a vision system with an FOVE having a metal casing with built in bracket channels according to a further illustrative embodiment and further defining overlap regions between FOVE fields of views.
FIG. 14A is a diagram of the positions of overlapping and non-overlapping regions on partial images projected onto the imager by the FOVE of FIG. 14.

With particular reference to FIG. 14, a vision system 1400 employing a camera assembly 1210 (described above) and an FOVE 1410 according to an illustrative embodiment. The FOVE 1410 consists of a mirror enclosure 1420, an extension tube 1430 and a coupling 1440, similar to the coupling 1214 described above. The camera assembly is shown rotated (curved arrow R) 90 degrees with respect to the above-described embodiments. Additionally, the mirror arrangement (described below) of the FOVE 1410 is oriented so that the field of view is rotated 90 degrees (curved arrow OR) with respect to an axis AP taken perpendicularly through the camera axis OA3 and parallel to the horizontal plane. That is, as shown, the camera axis OA3 is approximately parallel to the plane (as depicted) imaged scene 1450 and the view angle of the FOVE is directed vertically onto the scene. It is contemplated that the camera axis can be non-parallel to the scene and the view angle is off the vertical in alternate implementations. As shown, a pair of overlapping fields of view 1452 and 1454 is provided. The degree of overlap (OL) is variable, as described further below.

Figure 15:
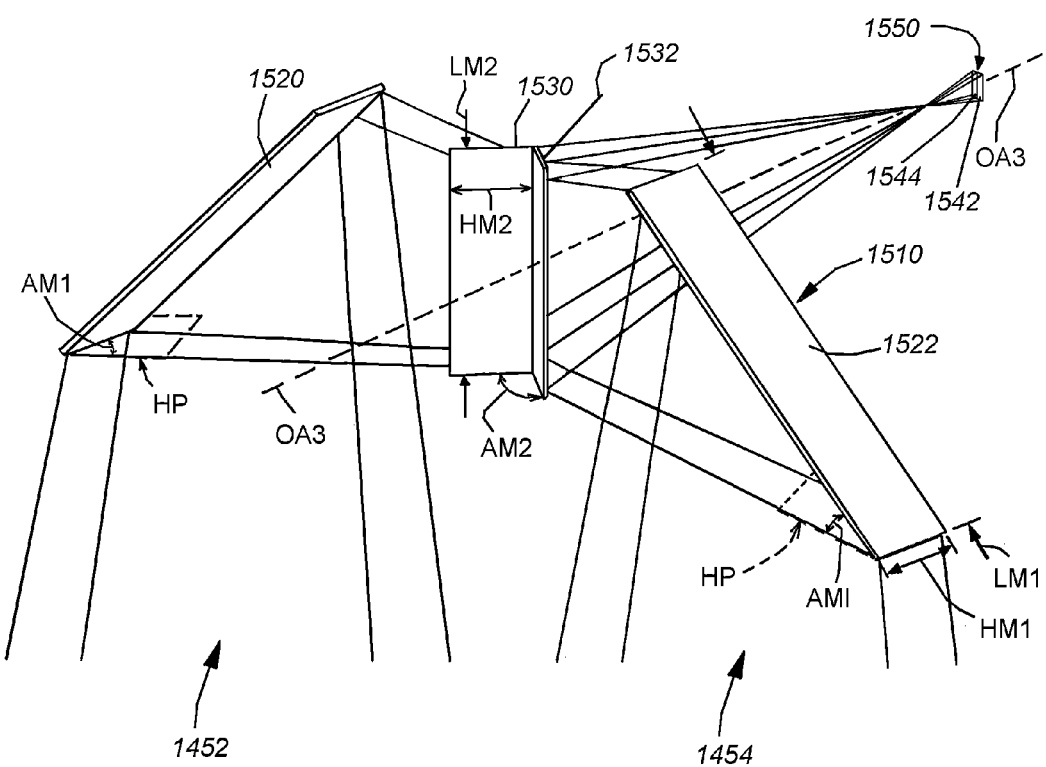
FIG. 15 is a perspective view of the arrangement of mirrors and associated optical path for the FOVE of FIG. 14.

With reference to FIG. 15, the geometry of the mirror arrangement 1510 within the FOVE 1410 is shown in further detail. The mirror arrangement 1510 consists of a pair of outboard angled mirrors 1520 and 1522 that are oriented at an acute angle AM1 with respect to the horizontal plane HP (parallel to the camera axis OA3). This angle can be approximately 45 degrees in an embodiment. Thus, light is reflected by each mirror 1520, 1522 from a portion of the underlying scene toward each of a pair of vertically arranged inboard mirrors 1530, 1532, respectively. These mirrors define a "beam splitter" with a vertically oriented V-shape centered through the axis OA3 as shown. They each lie in intersecting planes generally perpendicular to the horizontal plane HP. They are angled with respect to each other at an angle of AM2 of approximately 90 degrees as shown, centered about the axis OA3 (i.e. each vertical mirror being 45-degrees with respect to the associated outboard mirror. In an illustrative embodiment the outboard mirrors 1520, 1522 have a height HM1 of approximately 45 millimeters and a length LM1 of approximately 192 millimeters, but these measurements are highly variable in alternate embodiments. Likewise, the inboard mirrors 1530, 1532 each have a height HM2 of approximately 36 millimeters and a length LM2 of approximately 100 millimeters. Again, these measurements are highly variable in alternate embodiments. The overall length of the mirror enclosure is approximately 25 inches.

As shown in FIG. 15, the mirrors 1520, 1522, 1530 and 1532 reflect light from the scene (fields of view 1542 and 1454) into two, respective, 90-degree rotated strips 1542 and 1544 that are horizontally stacked. These stacked strips 1542, 1544 are projected onto the camera imager 1540 as depicted. The geometry of the mirrors generates a horizontal stacking, rather than a vertical stacking of strips as described in the above embodiments (i.e. FIG. 1 and FIG. 12). Thus, to appropriately orient the imager with respect to the strips (and provide a vertical stacking of strips at the imager) the camera assembly is rotated about the axis OA3 by 90 degrees (curved arrow R in FIG. 14). The direction of rotation can be clockwise or counterclockwise. In alternate embodiments, the camera assembly is free of rotation and the strips are projected in horizontal stack. The vision system and decoding processes are adapted to operate on such horizontal stacks in such alternate embodiments.

Figure 16:
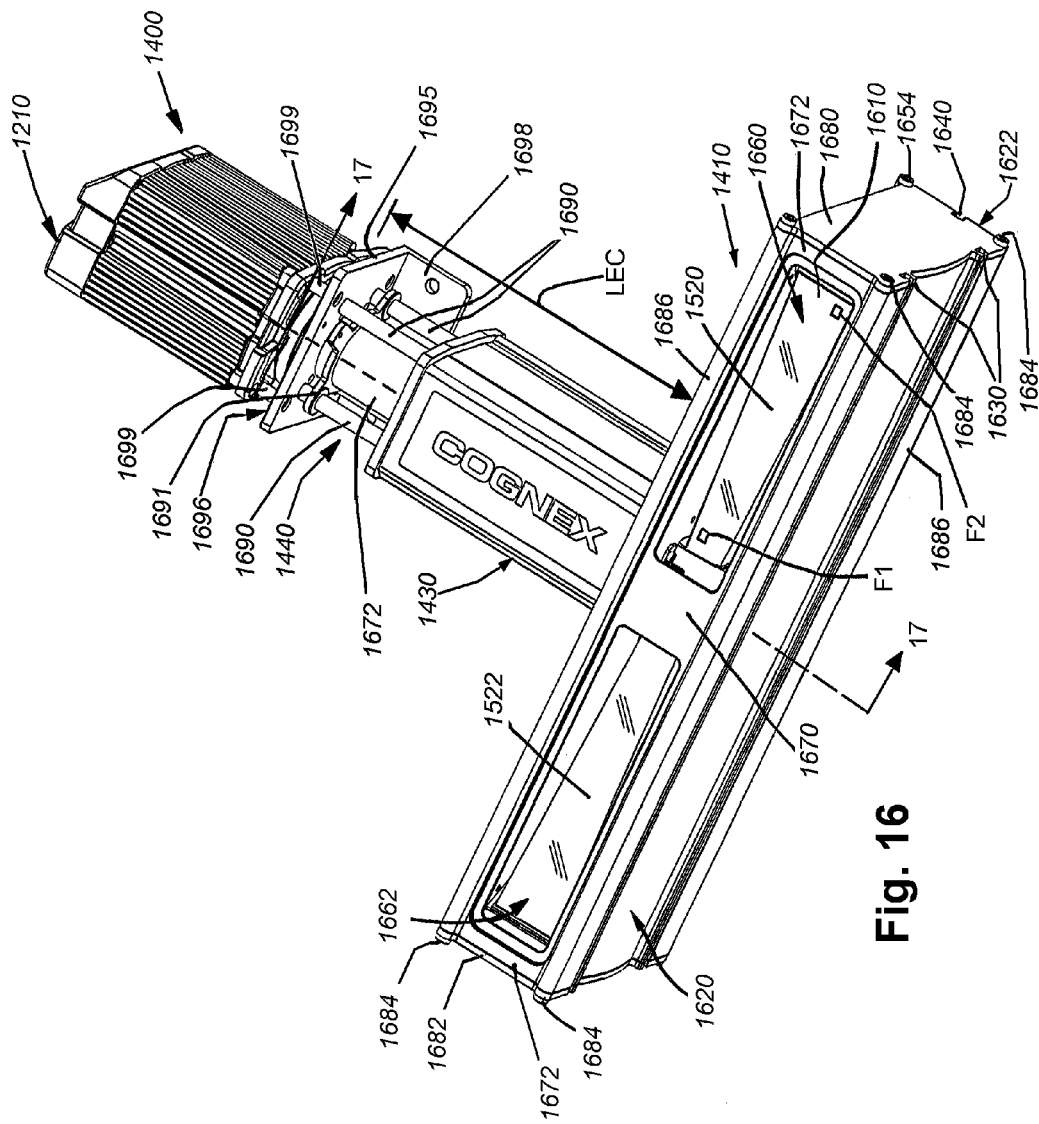
FIG. 16 is a bottom perspective view of the vision system and FOVE of FIG. 14.
Figure 17:
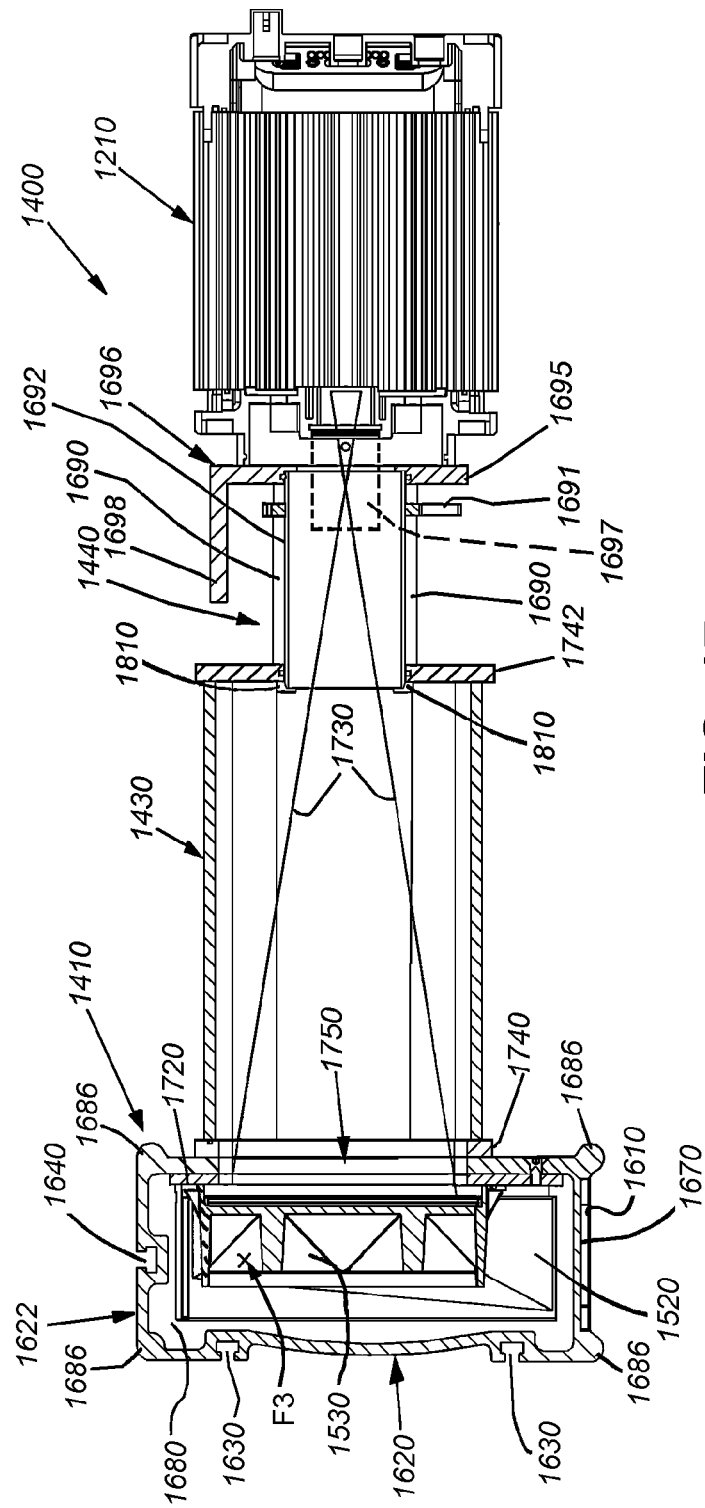
FIG. 17 is a side cross section of the vision system and FOVE taken along line 17-17 of FIG. 16.

Having described the general arrangement an operation of the FOVE mirror arrangement, the construction of the FOVE 1410 is described in further detail. Referring to FIGS. 16-17, the overall structure of the FOVE 1410 in the vision system 1400 is shown in further external and internal detail. As shown in FIG. 16, the FOVE mirror enclosure 1420 includes a bottom window 1610 that covers the outboard mirrors 1520, 1522. The mirror enclosure 1420 is illustratively constructed from a metal extrusion (e.g. aluminum alloy), or another acceptable material (e.g. polymer, composite, etc.). The cross section of the enclosure 1420 defines an approximately rectangular "tube" with a slightly bowed front 1620, mainly for aesthetics. Aluminum provides sufficient strength and stability to maintain the mirrors in secure alignment and attachment to the camera assembly. The extruded enclosure 1420 also provides for full-length keyway slots 1630, 1640 respectively along (at least) the front 1620 and top 1622. These keyway 1630, 1640 slots allow for the attachment of accessories, such as one or more illuminators (e.g. bar illuminators as described above). The slots also enable the enclosure to be secured to a mounting bracket or other supporting component. One or more headed bolts or threaded studs of appropriate size and shape can be passed into a slot to facilitate a connection. Alternatively a T-shaped rail can be passed into the slot.

As described further below, the mirrors 1520, 1522, 1530, 1532 are mounted on a mirror mounting plate 1720 (FIG. 17) that is secured by threaded fasteners to the rear face of the enclosure 1420. Alternate attachment techniques (e.g. adhesive, clips, etc.) are expressly contemplated. By providing the mirrors and their associated brackets (described below) on a common mirror mounting plate 1720, the construction can be assembled externally and then slid into the tubular enclosure 1420 upon completion. The enclosure includes a pair of ports 1660 and 1662 that allow light to pass into the mirrors 1520 and 1522 The ports can be formed in the originally solid bottom wall of the extrusion in a variety of manners (e.g. machining, laser cutting, punching, etc.). The ports 1660 and 1662 are separated from the ends by edge sections 1672, and are separated from each other by a central bridge section 1670. The central bridge section underlies the vertical V-shaped inboard mirror assembly (1530, 1532), and thus, is fee of interference with the view of the scene. The opposing ends of the mirror enclosure 1420 are each capped with gasketed end cover plates 1680, 1682 constructed from metal (e.g. steel, aluminum alloy, etc., a polymer or a composite. The cover plates 1680, 1682 are removably secured in place by fasteners 1684 that are threaded into holes formed in corner beads 1686 of the extrusion. These corner beads 1686 also serve to reinforce the unitary joints between sides of the enclosure. Note that the profile of each keyway slot 1630, 1640 is carried through the perimeter of the cover plate 1680, 1882 so that an item can be slid on or off the enclosure while the cover plates are installed.

The extension tube 1430 is provided to (in combination with coupling 1440) afford sufficient focal distance to the assembly (see rays 1730). This tube 1430 also comprises an extrusion, typically formed from aluminum alloy. Similarly to the mirror enclosure 1420, other materials are expressly contemplated for this component. The extension tube 1430 is secured to adapter plates 1740, 1742 at each end using threaded fasteners. An O-ring seal can be provided between each plate and the confronting end of the tube 1430. The adapter plate 1740 is, in turn secured by fasteners that pass from the inside of the extension tube 1430 into threaded holes in the enclosure 1420. Each of the adapter plate 1740, enclosure 1420 and mirror mounting plate define an aligned central orifice 1750 sufficient in size to allow light reflected from the mirrors to pass there through free of obstruction. The opposing extension tube adapter plate 1742, located adjacent to the coupling 1440, is also secured to the extension tube end by fasteners and includes a sandwiched O-ring seal. This plate is secured to pour posts 1690 within the coupling 1440 that provide support between the extension tube 1430 and the camera assembly 1210. With reference also to the more detailed view of FIG. 18, the posts 1690 are secured to the adapter plate 1742 by threaded fasteners 1810 that reside within the interior of the extension tube. The posts 1690 movably (double arrow 1820) support a slider 1691 that engages a sliding lens shroud 1692. O-rings 1830, 1832 are embedded within the inner circumference of the adapter plate 1742 and the opposing vertical face 1695 of the L-shaped bracket 1696. This bracket 1695 assists in supporting the overall assembly to a mounting structure, generally via fasteners attached to the horizontal face 1698. The bracket 1696 also provides a common connection between the camera assembly 1210 and the FOVE 1410 via its vertical face 1695. As described above, the lens shroud 1692 can be slid forwardly out of the depicted sealed position to reveal the lens 1697 (shown in phantom as an exemplary lens type). The vertical face 1695 is formed with a stop shoulder 1840 that defines the central orifice 1842. This shoulder prevents further forward movement of the shroud toward the camera assembly after it is sealingly engaged. A rear stop 1844 is also provided on the front end of the shroud to engage an inner face of the adapter plate 1742. The forward slidable movement of the shroud passes it into the interior of the extension tube 1430 until the slider engages the exterior wall of the adapter plate 1742. This should provide ample room to access the lens 1697 for adjustment and/or service. The bracket vertical face 1695 is attached to the camera assembly in a manner described generally above using fasteners that engage threaded holes in the camera's front face and standoffs/spacers 1699 that provide an appropriate gap.

Illustratively, the coupling 1440 is similar or identical in size, shape and construction to the coupling 1214 described above (FIGS. 12 and 13). Overall, the extension 1430 and coupling 1440 define a length LEC of approximately 254 millimeters. This affords a useful field of view of approximately 25 inches in width depending on desired resolution.

Figure 19:
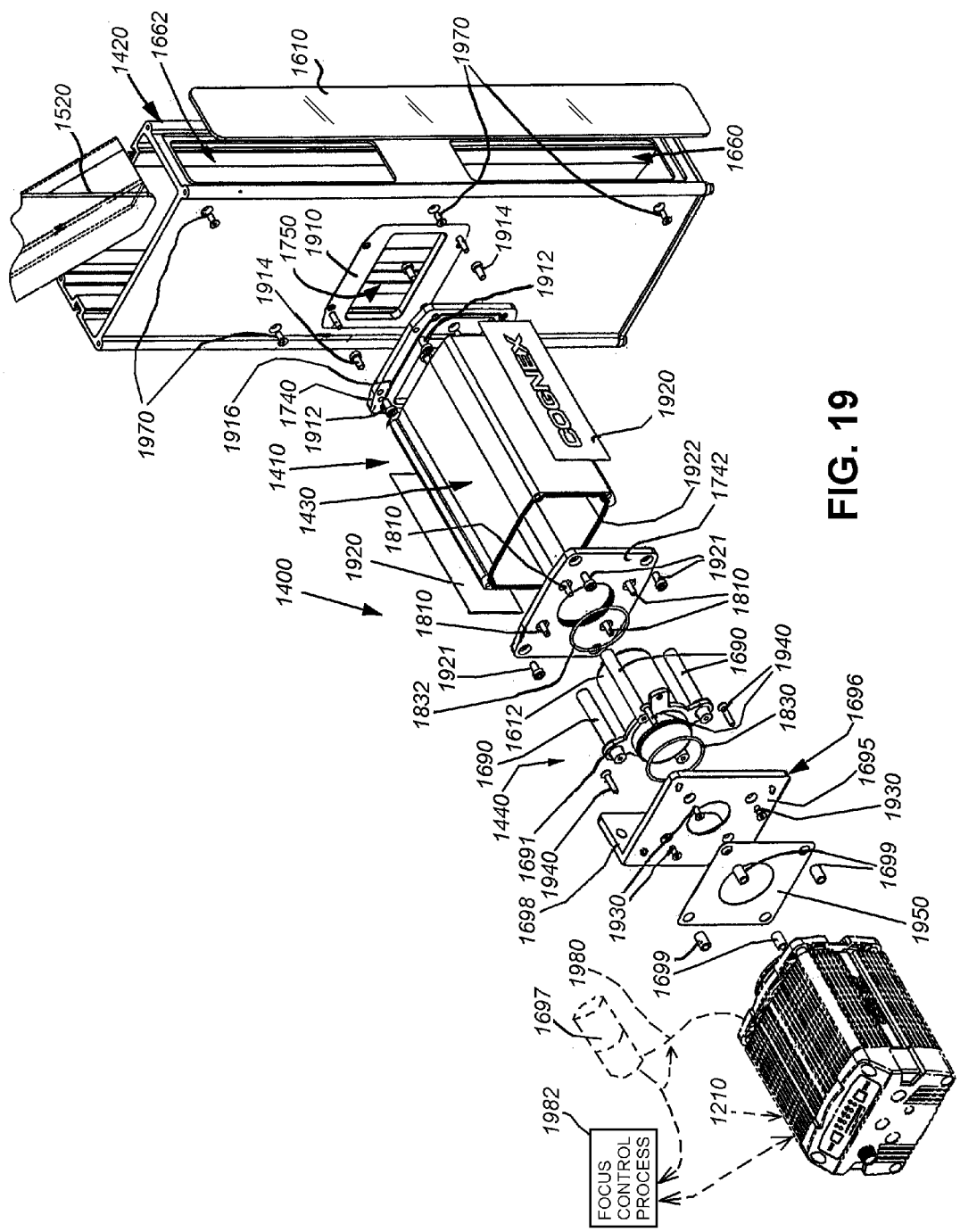
FIG. 19 is an exploded perspective view of the vision system and FOVE of FIG. 14.
Figure 20:
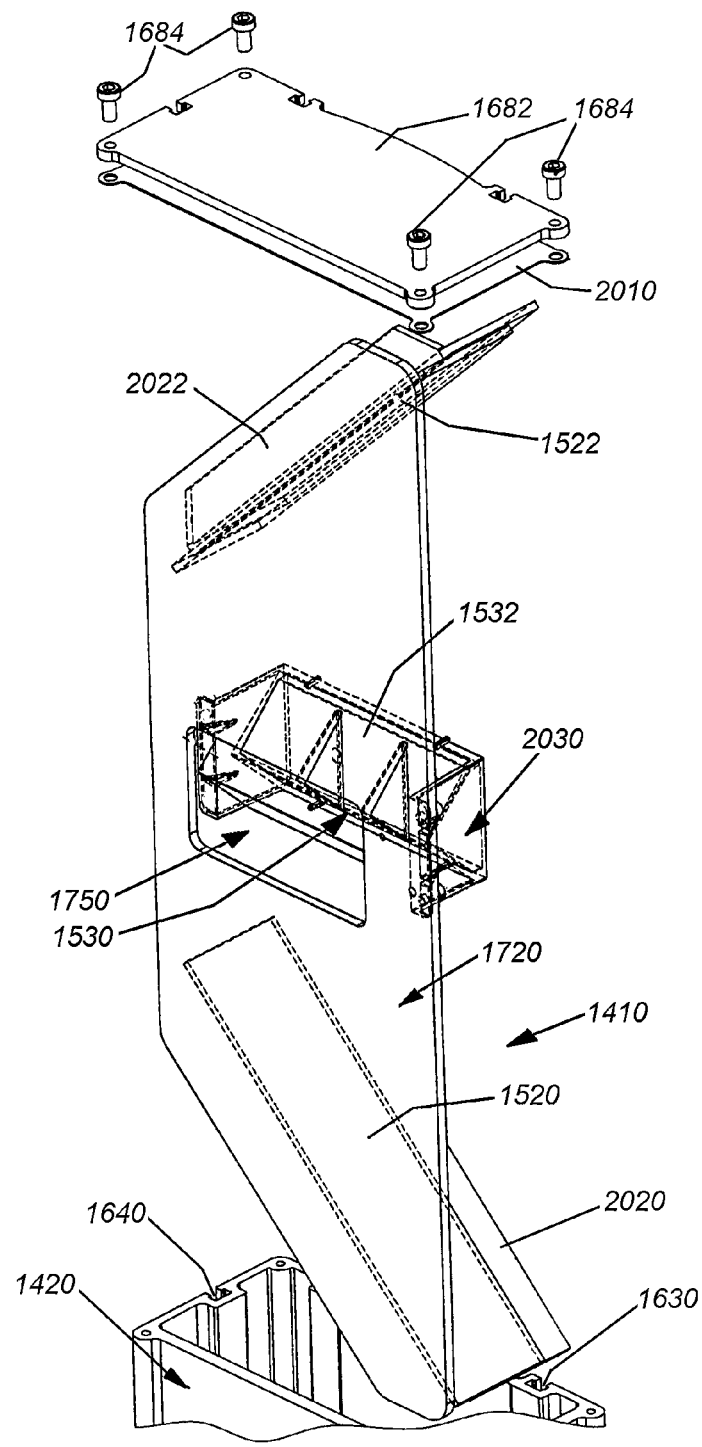
FIG. 20 is an exploded fragmentary perspective view of the mirror arrangement and base assembly therefor, for the FOVE of FIG. 14.

With brief reference to FIGS. 19 and 20, the construction of the FOVE 1410 is shown and described. The mirror enclosure 1420 with window 1662 is joined via a gasket 1910 to the adapter plate 1740 by fasteners 1912. The adapter plate 1740 is joined to the confronting end of the extruded extension tube 1430 by fasteners 1914, which compress an O-ring 1916 therebetween. A set of name plates or other informational decals 1920 can be provided to the sidewalls of the extension tube 1430 as an option. The opposing end of the extension tube 1430 is secured to a confronting face of the adapter plate 1742 by fasteners 1921, also sandwiching an O-ring 1922. The posts 1690 are secured to the adapter plate 1742 by above-described fasteners 1810. The remainder of the coupling components are described above, with fasteners 1930 interconnecting the posts 1690 to the vertical face 1695 of the bracket 1696. Fasteners 1940, in combination with a gasket 1950 and standoffs 1699, secure the bracket vertical face 1695 to the camera assembly 1210.

In FIG. 20, the mirror enclosure is shown with the mirror mounting plate 1720 removed. It can be slid into and out of the enclosure interior when at least one cover plate (e.g. plate 1682) is removed. A gasket 2010 is also provided to seal the joint between the enclosure and the cover plate. The mounting plate 1720 is illustratively secured within the housing by fasteners 1970 (FIG. 19) that pass through the rear side of the enclosure 1420, and into threaded holed in the mounting plate 1720. The mounting plate supports L-shaped brackets 2020 and 2022 that carry the respective outboard mirrors 1520 and 1522. An inner triangular bracket assembly 2030 is attached to the mounting plate 1720, suspended over the orifice 1750. It supports the two inboard mirrors 1530 and 1532 in a manner that transmits light reflected from the outboard mirrors 1520 and 1522 (respectively) through the orifice 1750. The orifice 1750 has an elongated aspect ratio that accommodates the length of the vertical mirror arrangement.

As an option, the FOVE of this, or other embodiments herein can be adapted to assist in lens auto-focus operations where the lens 1697 is based upon a liquid lens or other varioptic principle. Such auto-focus lenses can be interconnected to an interface on (for example) the front face of the camera assembly via a cable/link 1980 (see FIG. 19 below) that powers the lens based upon a focus control process 1982. Such a focus control process can operate based upon known techniques (e.g. determining the sharpness of image edges and readjusting until the optimal sharpness is achieved). In calibration and focus operations it can be desirable to acquire images of an object or other fiducial (e.g. a checkerboard or other recognizable discrete pattern) at a known focal distance. This can provide a base focal distance for the lens. As shown in FIGS. 16 and 17, a small fiducial can be applied to a known position on the FOVE in a location near an edge of the image where it is less likely to interfere with runtime image acquisition. Thus various optional fiducial locations are shown including the FOVE window 1610 (fiducial F1), the outboard mirror (fiducial F2) and/or the inboard mirror (fiducial F3). Other locations along the optical path can also be provided with appropriate marks or fiducials. Fiducials can be placed in a non-critical region of an image or can be provided to image in a wavelength that is only visible under certain illumination (e.g. near-IR) that is discrete from runtime image wavelengths. The focus process can discern the fiducial from the runtime image using a variety of techniques.

Figure 17A:
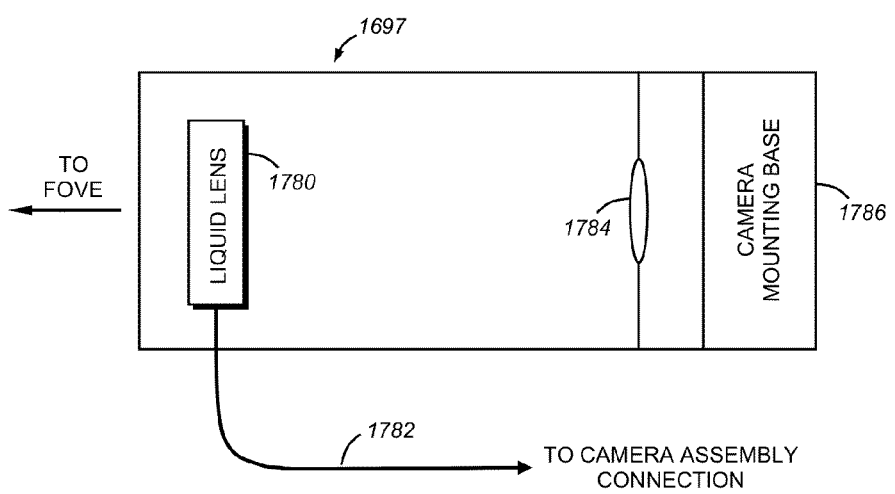
FIG. 17A is a schematic diagram of a liquid lens assembly for use with the vision system and FOVE according to various embodiments herein.
Figure 18:
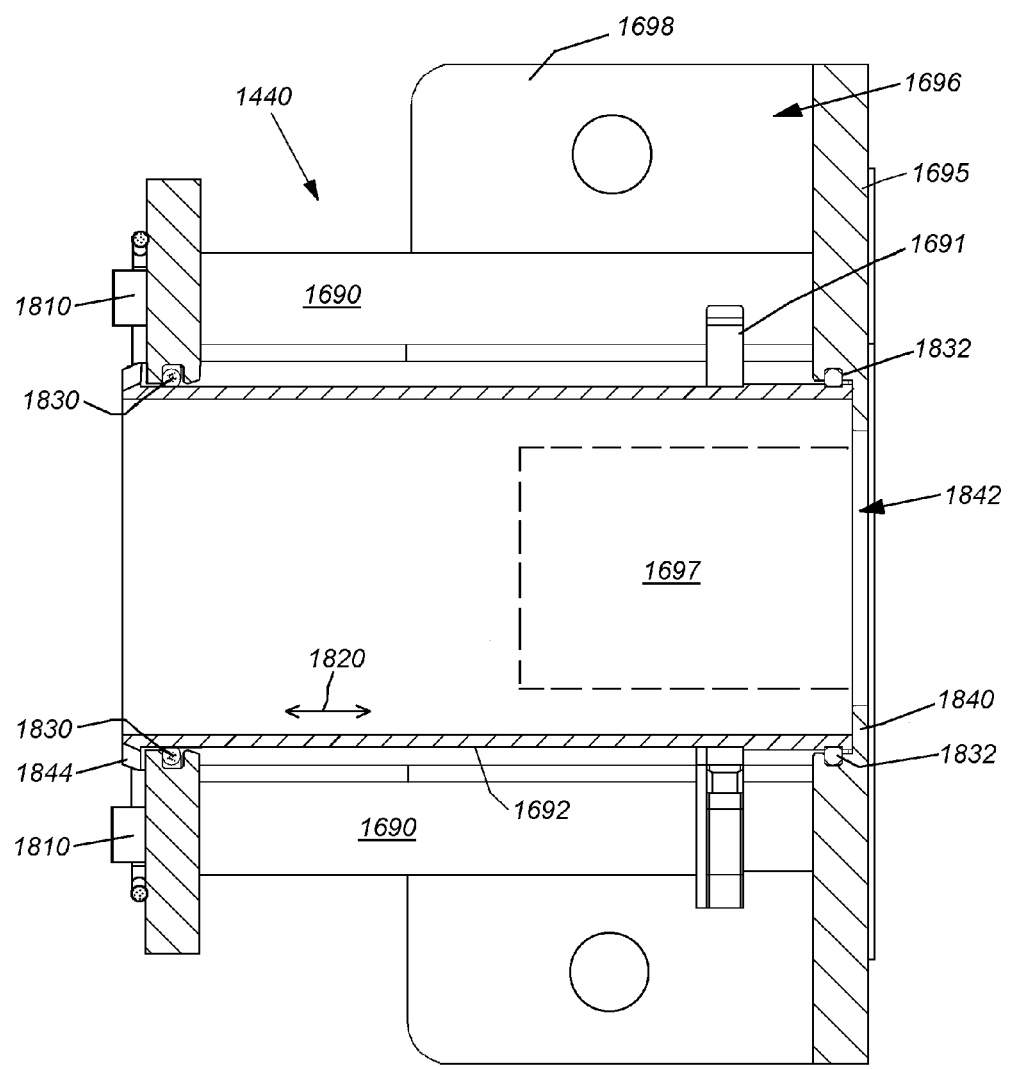
FIG. 18 is a more detailed top cross section of the bracket and movable lens shroud in the coupling region between the camera assembly and FOVE body in the vision system and FOVE of FIG. 14.

One form of fast-operating liquid lens assembly that can be employed in conjunction with the system and FOVE according to the various embodiments herein (i.e. FIG. 1, FIG. 12 and FIG. 14) is the EL-6-18-VIS-LD membrane-based liquid lens available from Optotune AG of Switzerland. In addition to high speed operation, this lens defines, illustratively, a 6 millimeter aperture making it highly suitable for wider-area, high-speed operations. The illustrative variable lens package is sized 18×18.4×8.9 (thickness) millimeters. Control current is between approximately 0 and 200 mA. Response time is typically less than 2 milliseconds and settling time is typically less than 10 milliseconds. After integration of the liquid lens into a lens assembly, the overall lens assembly provides a field of view of approximately 20 degrees and a focal tuning range between 60 millimeters and infinity. In operation, the EL-6-18-VIS-LD is a shape-changing lens. It consists of an injection-molded container, which is filled with an optical fluid and sealed off with an elastic polymer membrane. The deflection of the lens is proportional to the pressure in the fluid. The EL-6-18 employs an electromagnetic actuator that is used to exert pressure on the container. Hence, the focal distance of the lens is controlled by the current flowing through the coil of the actuator. This distance decreases with decreasing applied current. FIG. 17A schematically depicts the liquid lens assembly 1692, which includes the liquid lens unit 1780 having associated cable 1782. This cable 1782 is connected to a connector on the camera assembly. A rear lens 1784 is provided. A camera mounting base (for example, a C-mount base) 1786 removably interconnects the assembly to the camera assembly.

Figure 21:
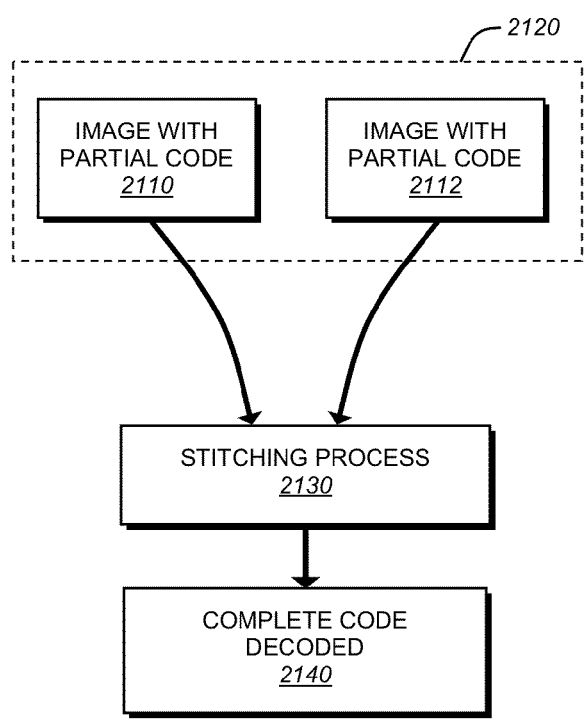
FIG. 21 is a block diagram of a process for stitching together images with partial code information across the field of view and/or over time.

While the various FOVE implementations described herein contemplate occurrence of an overlap between fields of view that can contain a complete ID. However, with reference to FIG. 21 it is expressly contemplated that the vision process can include a stitching process that searches for a partial features (partial symbols or codes) in each of the two images 2110, 2112 generated by the FOVE and captured in the overall image frame 2120 within the imager. The images 2110 and 2112 are handled by a stitching process 2130 within the overall vision process, which searches for code features in each of the two images—typically at the boundary separating each of the images in the field of view. The stitching process 2130 attempts to assemble (stitch) a single code image from the partial code images, and then decode this assembled code image. Alternatively, the stitching process attempts to decode each of the two partial codes separately and assemble the (e.g. alphanumeric) results into a single sequence. In both instances the goal of stitching is to generate a single set of results 2140 from two (or more) images provided by the FOVE to the imager. A variety of implementations that should be clear to those of skill can be employed to perform the stitching of codes/code data from the two (or more) images. In an alternate embodiment, the images 2110 and 2112 can be provided at differing acquisition times—for example in a sequence of image frames as the object passes through the scene on a conveyor. This is desirable where a code is somewhat long and moves through the field of view over a number of capture cycles.

Figure 22:
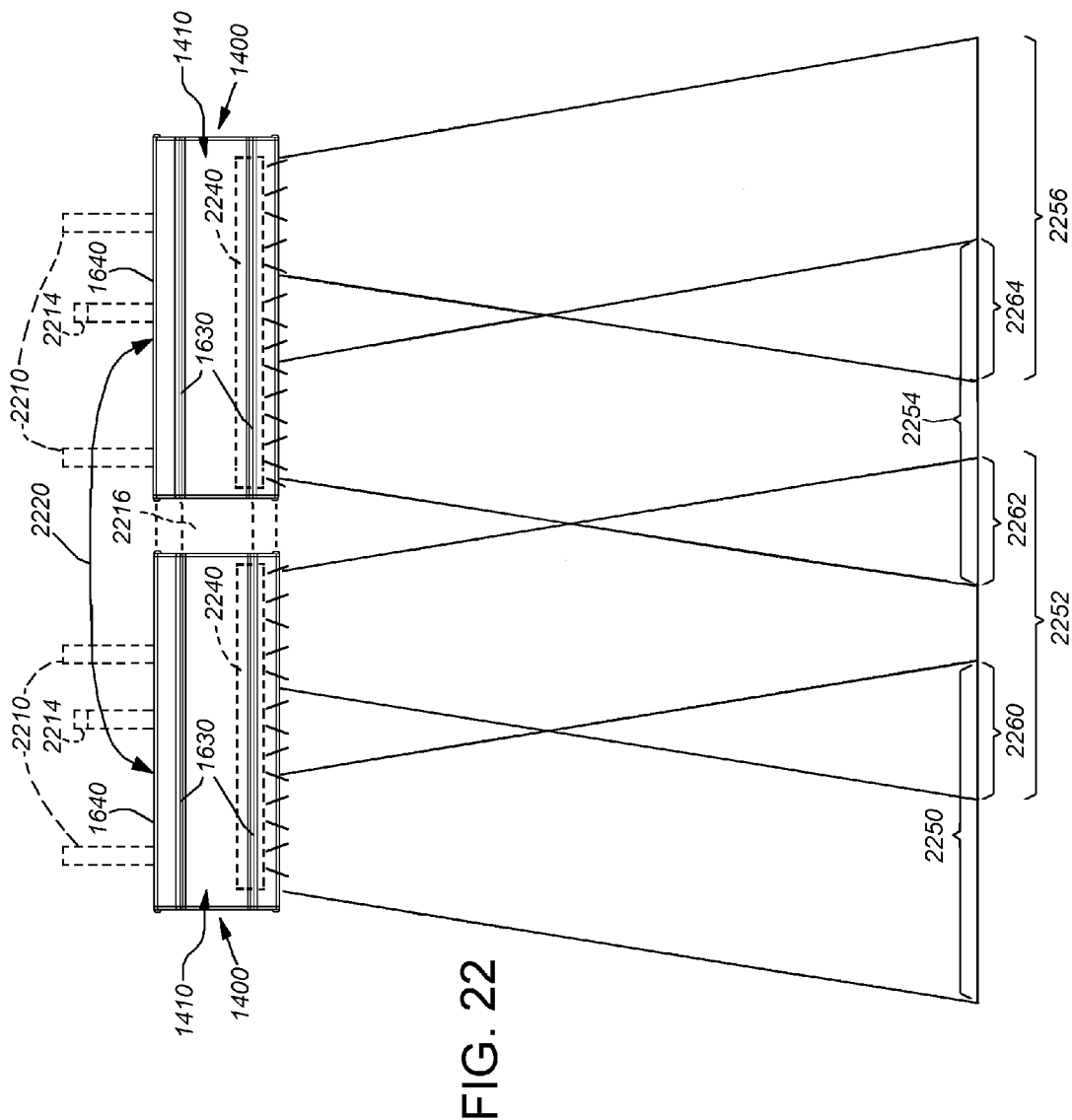
FIG. 22 is a front view of a pair of side-by-side, operatively interconnected vision systems with FOVE attachments in accordance with FIG. 14.

A further optional arrangement is shown in FIG. 22, in which a pair of vision systems 1400 in accordance with FIG. 14 above are mounted in a side-by-side arrangement to allow reading of a wider field of view. In this example, the two FOVEs 1410 are mounted on overhead posts 2210 (shown in phantom), which engage the top keyway slot 1640 of each FOVE housing. Each system 1400 also includes a rear post (or other mounting structure) 2214 that is attached to the bracket 1696 (described above) adjacent to the camera assembly. This arrangement provides a stable three-point mounting structure. A variety of alternate mounting arrangements can be employed including arrangements that engage other keyway slots (e.g. front slots 1630). A connector 2216 (shown in phantom can be used to interconnect the two FOVE units. This coupling can be a variety of widths depending upon the desired overlap in fields of view between separate FOVEs. Illustratively the coupling can engage the keyway slots 1630, 1640. While shown at a spacing between each other in FIG. 22, in various embodiments, the FOVEs can be closely butted together.

As shown, the two systems 1400 are tied together by a cable or other link 2220 that allows for coordinated operation of image capture, illumination, image processing and other functions. The processes can be carried out in parallel in each vision processor (i.e. in each camera assembly) with appropriate signals passed between units to coordinate operation. Alternatively, the arrangement can function in a master-slave mode with one of the systems directing triggers, image processing and/or other functions. As shown, the lower front keyway slot 1630 of each system 1400 includes a mounted bar illuminator (also shown in phantom). These can be interconnected with a trigger/power source on the associated system camera assembly or with an external device. The resulting field of view is composed of four overlapping fields of view 2250, 2252, 2254 and 2256, with overlap regions 2260, 2262 and 2264. Features within central overlap region 2262 can be read using one or both of the vision processors and appropriate links (2220) between camera assemblies.

Figure 23:
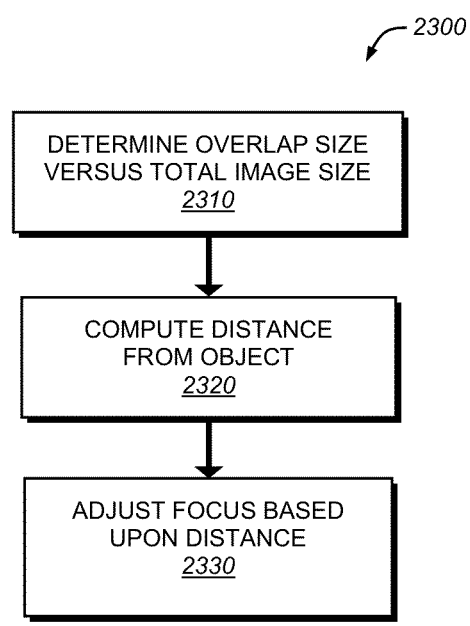
FIG. 23 is a flow diagram of a procedure for determining object distance and focus adjustment based upon degree of overlap of images provided by the FOVE to the imager.

Another optional process 2300 detailed in FIG. 23 entails measurement of distance to an object or scene by determining the size of the overlap between discrete fields of view. Referring also to FIG. 14, the distance to the object or scene DS can vary, causing a variation in the width OL of the overlap region between fields 1452 and 1454 and the width of the corresponding non-overlap region NOL in each field 1452, 1454. Using straightforward linear computations (see below), the vision process can compute distance to the object based upon the measured overlap in the imager versus the overall size of the image (steps 2310 and 2320), and use this to adjust focus if required to obtain a decodable image (step 2330). Determination of overlap entails a determination by the vision process of the point along the width in each image strip where features (contrasts) are duplicated. This can be accomplished using a variety of conventional pattern matching tools. This technique can occur with relative speed and can employ sub-sampled images (i.e. images with a lowered or sparse pixel resolution (e.g. using down-sampling of the full-resolution image).

The overlap region in the arrangement of FIG. 14 begins below the dashed line 1462. Above this the fields of view are separated by a gap GF. The distance d is defined from the start (line 1462) of the overlap region, and at line 1462 d=0. The width of the overlap region OL is proportional by a constant K to the distance d. Therefore:

$$OL = K \cdot d, \text{ and}$$

the non-overlap region of the field of view NOL also defines a constant width for distance d>0. With reference also to FIG. 14A, the layout of the image 1460 generated by the arrangement of FIG. 14 is depicted. The two image (partial) fields of view IFOV1 and IFOV2 include overlap regions 1466. Thus:

the ratio R between the overlapping (1466) and non-overlapping (1468) areas of the image 1460 (where m is the optical magnification of the system (i.e. m=image size/object size) can be expressed as:

$$R = m \cdot OL / m \cdot NOL = K \cdot d / NOL. \text{ It follows that:}$$

$$d = R \cdot NOL / k$$

Since the distance from the image plane to the line 1462 is known, the value d allows the focal distance to be determined for auto-focus processes.

Figure 24:
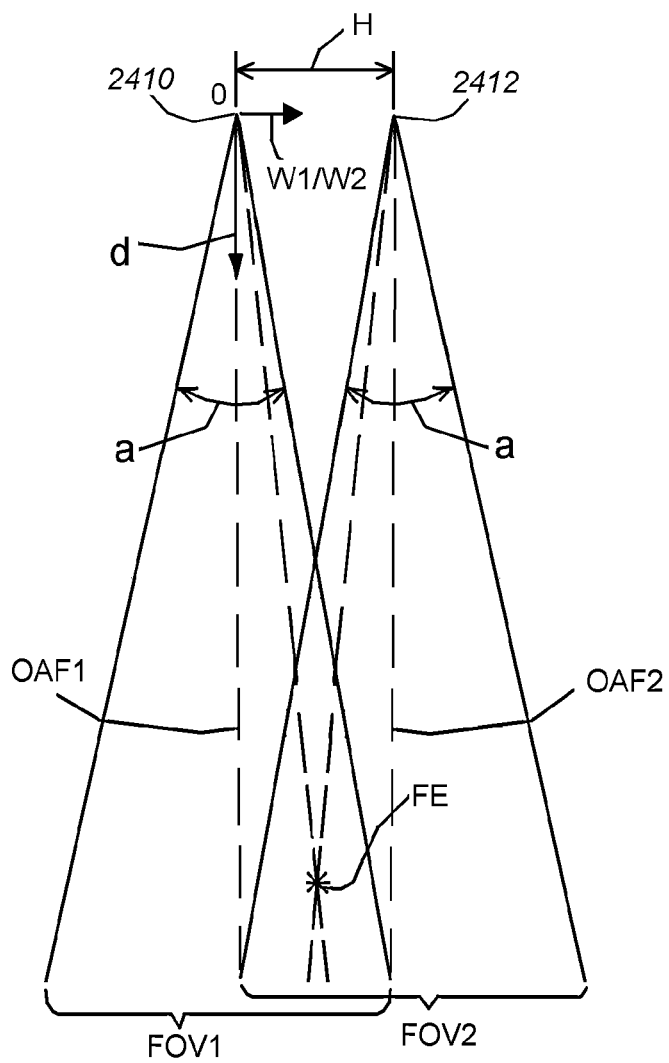
FIG. 24 is a diagram showing the geometry of the two fields of view defined by the FOVE and the relative positioning of a feature that is common to both fields over view in the overlap region thereof by which focal distance can be determined.
Figure 24A:
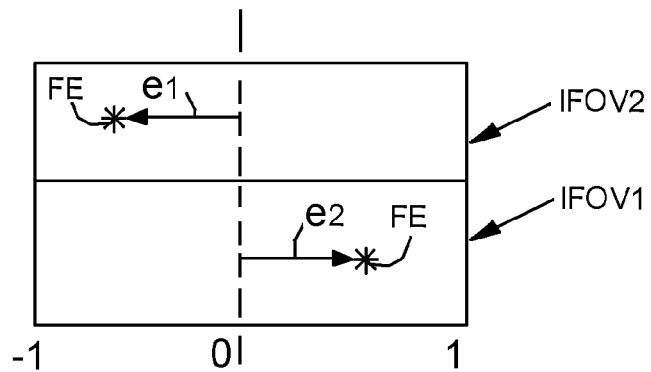
FIG. 24A is a diagram showing the relative positions of the feature on partial images projected onto the imager by the FOVE of FIG. 24.

In a further embodiment, it is contemplated that the relative placement of a code or other common feature in each partial image can be used to determine the distance to the object. That is, as the relative position of a feature changes as the feature becomes closer or further away, this difference can be used to determine distance. In general each version of the feature occupies a different location within the associated partial image. A lookup table or other computation can translate the registered difference of position between partial images into a distance value d. By way of illustration, FIG. 24 is a diagram showing two (partial) fields of view FOV1 and FOV2 of the scene at a distance d from focal points 2410, 2412. Likewise, two corresponding (partial) image field of vies IFOV1 and IFOV2 are depicted in FIG. 24A. A feature FE (e.g. a recognizable code) is present in each field of view FOV1 and FOV2 and appears at a relative position in each of the partial images IFOV1 and IFOV2, which range between an arbitrary width position of −1 and +1, with 0 at the center of each partial image. The following process steps enable determination of distance d:
1) The system locates the feature FE in each partial image IFOV1 and IFOV2;
2) The relative position e1 of the feature FE for partial image IFOV1 (−1<e1<1) is determined, wherein the width coordinate w1 of the feature FE can be defined as: w1=e1·tan (a/2)·d, in which the angle a is the opening angle of the camera lens in the width direction;
3) The relative position e2 of the feature FE for partial image IFOV2 (−1<e2<1) is determined, wherein the width coordinate w2 of the feature FE can be defined as: w2=e2·tan (a/2)·d+H, in which H is the distance between the optical axis of each partial field of view OAF1 and OAF2; and
4) The distance d can be computed from the image as follows:
d=H/((e1−e2)·tan (a/2)).

This allows adjustment of the auto-focus lens by providing the distance value d and corresponding this value to an appropriate focus setting for that distance.

Note, as detailed in FIG. 24, the optical axes (center axes) of each partial field of view (e.g. FOV1 and FOV2) for the illustrative FOVE of this and other embodiments herein (i.e. FIG. 1 and FIG. 12) are parallel as a characteristic of the system. Moreover, the illustrative stationary-mirror-based FOVEs illustratively direct the optical path of each partial field of view through at least two mirrors—with four or more total mirrors employed to generate two partial fields of view. In addition, illustratively, the stationary-mirror-based FOVEs of the illustrative embodiments are characterized in that the (focused) optical path length for each partial field of view is similar or identical. Given parallel optical axes for each partial field of view in this FOVE arrangement, the respective focal planes are similarly parallel. As such, the illustrative FOVEs are generally optimal in their arrangement and function for applications in which relatively flat, wide objects should desirably remain in focus for imaging—such as large cartons and boxes. Also, this arrangement desirably enables side-by-side placement of multiple camera assemblies with attached FOVEs as shown in FIGS. 9 and 22. In such arrangements, the overlap between adjacent, side-by-side vision system's fields of view can be defined similarly to the internal overlap with each discrete system, making the processing of data between adjacent systems more straightforward.

It should be clear that the FOVE according to the various embodiments herein provides a desirable system and method for expanding a field of view in a vision system that searches for, and analyzes, features of interest, such as barcodes/IDs, without loss of desired resolution. The implementation requires little or no modification to existing camera optics, hardware or software and is relatively straightforward to implement in a production environment. Desirably, various implementations of the FOVE maximize the use of a conventional format sensor by narrowing the effective height and widening the effective width to a dimension more suited to scanning a wide, moving line. Moreover, the FOVEs of this embodiment allow for the removable attachment to the FOVE assembly to a variety of camera assemblies as an added feature, thereby increasing their flexibility and allowing for upgrade and re-tasking of vision system components.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while the features of interest described according to illustrative embodiments are IDs/barcodes (e.g. any form/type of one-dimensional, two-dimensional, etc.), the principles of the embodiments herein can be used to analyze and process a variety of features of interest, including, but not limited to, various forms of printed or applied fiducials, alphanumeric, graphical, numeric or other written characters, proof marks, and the like. In addition the principles herein can be employed to analyze and process other forms of features that may occur periodically across portions of an expanded width of a field of view. For example, while the FOVE according to various embodiments herein is described as expanding the field of view of a scene in the horizontal or widthwise direction, it is expressly contemplated that a field of view can be expanded by the FOVE in a vertical direction, or in an oblique orientation between horizontal and vertical. Also while various embodiments generate discrete strips on the sensor from associated fields of view other geometric shapes are contemplated, so long as a feature can be fully imaged in at least one portion of the projected field. Likewise, the projected geometric features (e.g. strips) on the sensor need not be symmetrical with respect to each other in height and/or width. Also, while the outer mirrors of the illustrative FOVE are shown as generally vertical, and the reflecting surfaces of the inner mirrors of the beam splitter are shown with a slight vertical tilt, it is contemplated that the outer mirrors can define a vertical tilt in the alternative or both the outer and inner mirrors can define a vertical tilt as appropriate to generate the desired strips (or other geometric projections) on the sensor. Likewise, while the strips are stacked "vertically" it is contemplated that a horizontal/side-by-side stacking of strips (or other geometric shapes) can occur at the sensor based upon a projection of the imaged scene's multiple fields of view. Moreover, the term "process" or "processor" as used herein should be taken broadly to include both hardware and software operations (and various combinations thereof) that can be performed with one or more of the depicted functional blocks or divided in whole, or in part amongst the various depicted functional blocks. Accordingly, this description is meant to be taken only by way of example, and not to otherwise limit the scope of this invention.

What is claimed is:

1. A system for expanding a field of view of a scene imaged by a vision system camera having a lens assembly and an image sensor defining an image plane, the system being constructed and arranged to search and analyze features of interest in the scene comprising:
   at least a first mirror and a second mirror that transmit light from a field of view in a scene in at least a first partial field of view along a first optical axis and a second partial field of view along a second optical axis; and
   at least a third mirror receiving reflected light from the first mirror and a fourth mirror receiving reflected light from the second mirror, the third mirror and the fourth mirror reflecting the light through the lens assembly onto the image plane in a first strip and a second strip adjacent to the first strip,
   wherein the first optical axis and the second optical axis are approximately parallel and a first focused optical path length between the scene and the image plane and a second focused optical path between the image plane and the scene are approximately equal in length.

2. The system as set forth in claim 1 wherein the first strip and the second strip are arranged in a vertically stacked relationship on, each having a common horizontal overlap region.

3. The system as set forth in claim 2 wherein the overlap region is at least as large horizontally as a largest feature of interest to be searched by the vision system camera.

4. The system as set forth in claim 3 wherein the searched feature of interest is a symbology code, the system further comprising a symbology code decoding system that receives information related to located symbology codes from the vision system camera and outputs code data to a further interconnected process.

5. The system as set forth in claim 4 wherein the symbology code is located on an object moving on a conveyor through the scene.

6. The system as set forth in claim 1 wherein the first mirror comprises a first outboard mirror oriented over the first partial field of view and the second mirror comprises a second outboard mirror oriented over the second partial field of view, each of the first outboard mirror and the second outboard mirror being oriented at an acute angle with respect to a horizontal plane,
   the third mirror comprises a first inboard mirror and the fourth mirror comprises a second inboard mirror, each of the first inboard mirror and the second inboard mirror being respectively located on a first vertical plane and a second vertical plane, each substantially perpendicular to the horizontal plane,
   wherein the first inboard mirror and the second inboard mirror are constructed and arranged to direct light from a scene from a vertical optical path through a right angle onto a horizontal optical path toward the image sensor.

7. The system as set forth in claim 6 wherein the sensor is rotated so that a width dimension is oriented vertically.

8. The system as set forth in claim 6 wherein the first outboard mirror and the second outboard mirror are each oriented at opposing 45-degree angles with respect to the horizontal plane.

9. The system as set forth in claim 8 wherein the first inboard mirror and the inboard mirror are each oriented at opposing 45-degree angles with respect to each of the first vertical plane and the second vertical plane, respectively, that each (a) is perpendicular to the horizontal plane and (b) resides on an optical axis of the vision system camera.

10. The system as set forth in claim 6 wherein the first outboard mirror, the second outboard mirror, the first inboard mirror and the second inboard mirror are mounted in a mirror enclosure having a unitary tubular structure and at least one removable end cover.

11. The system as set forth in claim 10 wherein the mirror enclosure includes keyway slots for engaging mounting structures and accessories.

12. The system as set forth in claim 11 wherein the accessories include illuminators.

13. The system as set forth in claim 1 wherein the first mirror, the second mirror, the third mirror and the fourth mirror are enclosed in a housing and the housing is operatively connected to a coupling removably attached to the vision system camera, the coupling including a sealed, slidable lens shroud that selectively allows access to the lens assembly of the vision system camera.

14. The system as set forth in claim 13 further comprising an extension tube that extends from the mirror enclosure to the coupling.

15. The system as set forth in claim 13 wherein the coupling is removably mounted to the vision system camera and the vision system camera is adapted for use free of the coupling.

16. The system as set forth in claim 1 further comprising a vision processor and wherein the lens assembly comprises a liquid lens assembly, and further comprising an auto-focus process operated by the vision processor constructed and arranged to focus the liquid lens assembly.

17. The system as set forth in claim 1 further comprising a vision processor that determines distance to an object based upon at least one of (a) size of an overlap region between the first partial field of view and the second partial field of view, and (b) relative position of an identified feature in an overlap region or the first partial field of view and the identified feature in an overlap region of the second partial field of view.

18. The system as set forth in claim 1 wherein the first mirror, the second mirror, the third mirror and the fourth mirror are located in a mirror housing having a housing optical path therethrough, and further comprising a vision processor that determines focus of the lens assembly based upon an image of fiducial located along the housing optical path.

19. The system as set forth in claim 18 wherein the fiducial is located on at least one of the first mirror, the second mirror, the third mirror, the fourth mirror, and a transparent window on the mirror housing.

20. The system as set forth in claim 1 wherein a first partial field of view and a second partial field of view are approximately free of overlap therebetween, and further comprising a vision processor that is constructed and arranged to identify a first partial code in the first partial field of view and a second partial code in the second partial field of view, the vision processor being further constructed and arranged to stitch together the first partial code and the second partial code and generate decoded information therefrom.

21. The system as set forth in claim 20 wherein the first partial code is provided in a first captured image frame at a first time, the first captured image frame being stored and the second partial code is provided in a second captured image frame at a second time subsequent to the first time.

22. The system as set forth in claim 1 wherein the first mirror comprises a first outer mirror oriented at an acute angle with respect to an optical axis of the vision system camera and the second mirror comprises a second outer mirror oriented at an opposing acute angle with respect to an opposing side of the optical axis, and wherein the third mirror and the fourth mirror comprise a beam splitter located forward of the first outer mirror and the second outer mirror in a direction taken from the vision system camera.

23. The system as set forth in claim 22 wherein further comprising a housing that encloses each of the first outer mirror, the second outer mirror and the beam splitter, the housing comprising an injection-molded structure polymer structure.

24. The system as set forth in claim 23 wherein each of the first outer mirror and the second outer mirror are mounted on a mirror-engaging side of respective unitary walls of the housing, the walls having unitary stiffing ribs on a side thereof opposite a mirror-engaging side.

25. The system as set forth in claim 24 further comprising a coupling removably attached to the vision system camera, the coupling including a sealed, slidable lens shroud that selectively allows access to the lens assembly of the vision system camera.

26. The system as set forth in claim 25 further comprising an accessory bracket operatively connected to the coupling and an illuminator adjacent to the housing and illuminating the scene, mounted on the bracket.

* * * * *